(12) United States Patent
Van Den Berg et al.

(10) Patent No.: US 11,439,121 B2
(45) Date of Patent: Sep. 13, 2022

(54) SYSTEM AND METHOD FOR MILKING A GROUP OF MILKING ANIMALS

(71) Applicant: LELY PATENT N.V., Maassluis (NL)

(72) Inventors: Karel Van Den Berg, Maassluis (NL); Paulus Jacobus Maria Van Adrichem, Maassluis (NL); Dik-Jan Wisse, Maassluis (NL)

(73) Assignee: LELY PATENT N.V., Maassluis (NL)

( * ) Notice: Subject to any disclaimer, the term of this patent is extended or adjusted under 35 U.S.C. 154(b) by 886 days.

(21) Appl. No.: 15/752,982

(22) PCT Filed: Jul. 19, 2016

(86) PCT No.: PCT/NL2016/050535
§ 371 (c)(1),
(2) Date: Feb. 15, 2018

(87) PCT Pub. No.: WO2017/034394
PCT Pub. Date: Mar. 2, 2017

(65) Prior Publication Data
US 2018/0235175 A1  Aug. 23, 2018

(30) Foreign Application Priority Data
Aug. 24, 2015 (NL) ...................................... 2015336

(51) Int. Cl.
*A01K 1/12* (2006.01)
*A01K 1/06* (2006.01)
*A01K 1/062* (2006.01)

(52) U.S. Cl.
CPC .............. *A01K 1/12* (2013.01); *A01K 1/0613* (2013.01); *A01K 1/062* (2013.01)

(58) Field of Classification Search
CPC .......... A01K 1/12; A01K 1/0613; A01K 1/062
See application file for complete search history.

(56) References Cited

U.S. PATENT DOCUMENTS 4,508,058 A    4/1985  Jakobson et al.
5,908,009 A *  6/1999  Cummings .......... A01K 1/0606
                                                     119/731

(Continued)

FOREIGN PATENT DOCUMENTS

EP    0 091 892 A2   10/1983
EP    1 336 337 A2    8/2003

(Continued)

OTHER PUBLICATIONS

International Search Report dated Jan. 18, 2017 in PCT/NL2016/050535 filed Jul. 19, 2016.

*Primary Examiner* — Son T Nguyen
(74) *Attorney, Agent, or Firm* — Oblon, McClelland, Maier & Neustadt, L.L.P.

(57) ABSTRACT

Described is a system for milking animals, including cows, having an accommodation space in which the animals can walk around, and several stationary milking stations placed next to each other. Each milking station at a head end thereof includes a neck lock device which can be moved by way of an actuator device between a locked state in which a milking animal in said milking station can be locked at the neck by said neck lock device, and an open state in which a milking animal in said milking station is free to move its head in and/or out of the neck lock device. Also included is an automatic milking system for the automatic milking of milking animals and a control system that is actively connected to the actuator device of each neck lock device.

19 Claims, 14 Drawing Sheets

(56) References Cited

U.S. PATENT DOCUMENTS

| | | |
|---|---|---|
| 2003/0154925 A1 | 8/2003 | Van Den Berg et al. |
| 2005/0120965 A1* | 6/2005 | Van Den Berg ......... A01K 5/02 |
| | | 119/14.02 |
| 2010/0064974 A1 | 3/2010 | Van Den Berg et al. |
| 2010/0139568 A1* | 6/2010 | Rousseau ............... A01K 15/00 |
| | | 119/14.04 |
| 2012/0037090 A1* | 2/2012 | Manwaring .......... A01K 1/0613 |
| | | 119/730 |

FOREIGN PATENT DOCUMENTS

| | | |
|---|---|---|
| FR | 2 704 720 A1 | 11/1994 |
| WO | 2014/055002 A1 | 4/2014 |

* cited by examiner

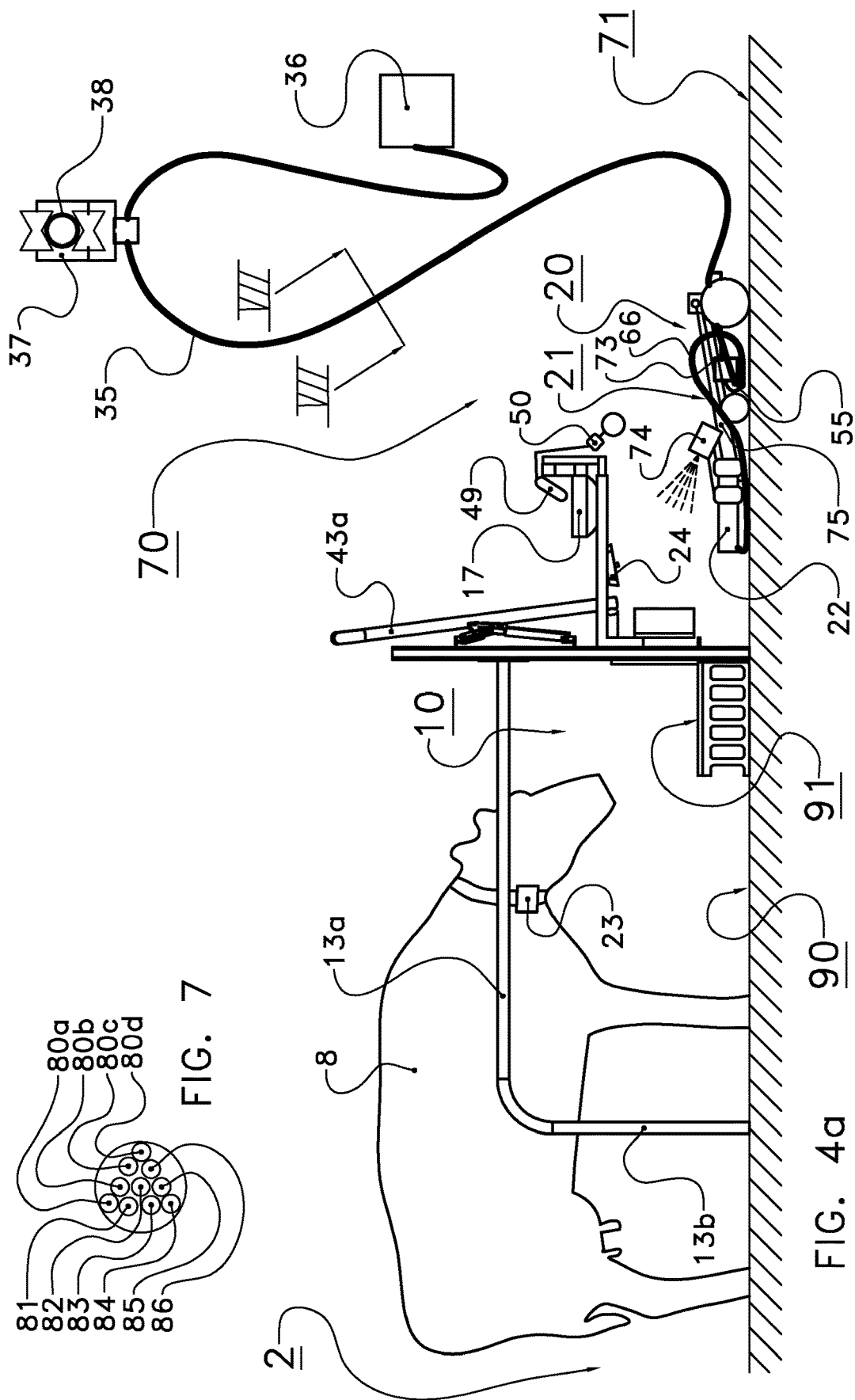

SYSTEM AND METHOD FOR MILKING A GROUP OF MILKING ANIMALS

The invention relates to a system and a method for milking a group of milking animals, in particular cows.

WO 2014/055002 A1 discloses an automatic milking system in which milking animals can walk freely around an accommodation space with feeding stations. The milking animals visit the feeding stations voluntarily. Each feeding station comprises a feed trough and a feed metering device for dispensing a specific quantity of feed such as concentrate. In front of each feed trough is a neck lock device for locking at the neck an animal which has pushed its head above or into the feed trough of a feeding station. Some of the feeding stations are configured as milking stations, i.e. an animal can be milked in these feeding stations. When an animal approaches such a feed/milking station, the animal is first identified and it is established whether the animal is ready for milking. If so, the animal is secured by the neck lock device and then milked. In practice, it has been found that an animal becomes restless and moves around when said animal is locked at the neck by such a neck lock device, which hinders the connection of the milking cups to the teats of said animal.

One object of the invention is to provide an improved system for milking a group of milking animals, in particular cows, wherein in particular the automatic connection of the milking cups can be carried out rapidly and reliably while the milking animals are locked at the neck in the milking stations.

This object is achieved according to the invention by a system for milking a group of milking animals, in particular cows, wherein the system comprises:

- an accommodation space for the milking animals, which is preferably stationary and/or comprises a fixed floor and/or is fenced off,
- a plurality of milking stations, preferably stationary milking stations, which are each arranged or placed at a fixed location and next to each other, wherein the milking stations each comprise an entry opening for entry of a milking animal from the accommodation space to said milking station, and wherein each milking station at a head end thereof, preferably situated opposite the entry opening of said milking station, comprises a neck lock device which comprises an actuator device and can be actuated and/or moved by means of said actuator device between a locked state in which a milking animal in said milking station can be locked at the neck by the neck lock device, in particular in order to secure and/or hold said milking animal in said milking station, and an open state in which a milking animal present in said milking station is free to move its head in and/or out of said neck lock device, and preferably is free to leave said milking station,
- a control system which is actively connected to the actuator device of each neck lock device, wherein the control system is configured to control the actuator devices, and
- an automatic milking system for the automatic milking of milking animals present in the milking stations, wherein in particular the milking system comprises milking cups and is configured to automatically connect milking cups to the teats of a milking animal, wherein the milking system is configured to milk a milking animal which is locked at the neck in a milking station by means of the neck lock device of said milking station and is preferably secured and/or held thereby on the condition that said milking animal fulfils a predefined milking criterion, in particular after the milking cups have been connected automatically to the teats of said milking animal by means of the milking system, wherein the control system is configured and/or programmed to determine and/or detect, for each milking station, whether a milking animal in said milking station has a position and/or attitude which is suitable for locking said milking animal at the neck by the neck lock device of said milking station, and to control the actuator devices such that each milking animal which enters one of the milking stations and then assumes the position and/or attitude which is suitable for locking said milking animal at the neck by the neck lock device of said milking station, irrespective of whether said milking animal fulfils the milking criterion, is locked at the neck in said milking station by movement of the neck lock device of said milking station from the open state to the locked state.

According to the invention, each milking animal is locked at the neck by the neck lock device on each visit to one of the milking stations. The control system is preferably configured such that the neck lock device of each milking station which is not occupied by a milking animal, is in the open state. As soon as the control system establishes that the milking animal, on a visit to a milking station, assumes a position and/or attitude which is suitable for locking said milking animal at the neck, in particular the position and/or attitude of the milking animal for eating and/or drinking from a feed and/or drinking trough of said milking station, the milking animal is locked at the neck so that said milking animal is secured in said milking station. Not only milking animals which fulfil the milking criterion, i.e. are ready for milking and must be milked, but also milking animals which do not fulfil the milking criterion, i.e. are not ready for milking and need not be milked, are locked at the neck by means of the neck lock device. In contrast to the prior art, wherein the milking animals are held at the neck during some visits but not during other visits, with the system according to the invention, the milking animals are always locked at the neck as soon as the milking animals have the suitable position and/or attitude, for example push their heads above or into a feed and/or drinking trough. It has been found that the milking animals become used to the neck lock if the neck lock is always applied, i.e. also if the milking animal need not be milked and therefore there is no real need to secure the milking animal. The milking animals thus become conditioned so the milking animals remain calm when the milking animals are locked at the neck. If the milking animals are ready for milking, the milking cups of the automatic milking system can thus be connected to the teats reliably and rapidly. The neck lock also has no harmful effect on the visit behavior of the milking animals to the milking stations.

In one embodiment, the milking stations at the head ends thereof comprise at least one feed and/or drinking trough, wherein the position and/or attitude of a milking animal in a milking station which is suitable for locking said milking animal at the neck by the neck lock device of said milking station, is formed by the position and/or attitude of said milking animal when said milking animal is situated with its head above or in the feed and/or drinking trough of said milking station. At each milking station, the at least one feed and/or drinking trough is positioned relative to the neck lock device such that a milking animal in said milking station must push its head through the neck lock device of said milking station, in the open state, in order to eat and/or drink from the feed and/or drinking trough. The neck lock device prevents the milking animal from being able to withdraw its head from the feed and/or drinking trough. The control system is configured to control the actuator devices such that each milking animal which enters one of the milking stations and then pushes its head above or into the feed and/or drinking trough of said milking station, irrespective of whether said milking animal fulfils the milking criterion, is locked at the neck in said milking station by movement of the neck lock device of said milking station from the open state to the locked state. According to the invention, each milking animal which in one of the milking stations pushes its head above or into the feed and/or drinking trough in order to eat and/or drink, is locked at the neck by the neck lock device so that said milking animal is held in said milking station. Since the milking animals, on visiting a milking station, almost always want to eat and/or drink from the feed and/or drinking trough of said milking station, it is guaranteed that on almost every visit the milking animals can be locked at the neck.

In one embodiment, each milking station comprises a separate feed and/or drinking trough, wherein the feed and/or drinking trough of each milking station is positioned relative to the neck lock device of said milking station such that a milking animal in said milking station must push its head through the neck lock device of said milking station, in the open state, in order to eat and/or drink. The feed and/or water in the separate feed and/or drinking troughs remains relatively fresh, which is favorable for the feeding and/or drinking behavior of the milking animals. It is also possible that, instead of separate feed and/or drinking troughs for each milking station, the milking stations comprise one or more common feed and/or drinking troughs, i.e. two or more milking stations situated next to each other share a common feed and/or drinking trough from which milking animals present in said milking stations can eat and/or drink. Evidently, the milking stations may comprise only one common feed and/or drinking trough for all milking stations situated next to each other.

In one embodiment, the system comprises a supply device for the supply of feed and/or water to each feed and/or drinking trough, wherein at the feed and/or drinking trough of each milking station, the supply device is provided with a sensor means for sensing whether a milking animal is positioned with its head above or in the feed and/or drinking trough, and wherein the supply device is configured such that feed and/or water are supplied to a feed and/or drinking trough only if the associated sensor means has sensed that a milking animal is positioned with its head above or in said feed and/or drinking trough. A milking animal visits the milking station to eat and/or drink. Since feed and/or water are supplied to the feed and/or drinking trough only after the milking animal has pushed its head above or into the feed and/or drinking trough, the milking animal will push its head above or into the feed and/or drinking trough. In this way, the milking animal has the position and/or attitude in which the milking animal can be reliably and safely locked at the neck.

The sensor means may be configured in various ways. For example, the sensor means comprise a respective valve at each feed and/or drinking trough, wherein each valve is biased or pretensioned to a closed state in which the supply of feed and/or water to the associated feed and/or drinking trough is shut off, and can be actuated by a milking animal from the closed state to an open state for the supply of feed and/or water to said feed and/or drinking trough. In this case, it is possible that the sensor means comprise a respective sensor at each feed and/or drinking trough, wherein each sensor is configured to detect whether feed and/or water are supplied to the associated feed and/or drinking trough. For example, water is only supplied to a drinking trough of a milking station when a milking animal operates a flap in said drinking trough with its nose, whereby the valve opens. In this case for example, the sensor comprises a flow meter in a supply line to the drinking trough. When the flow meter detects that water is flowing through the supply line to the drinking trough, this means that a milking animal has its nose in the drinking trough. In other words, only when the milking animal has actuated the valve does the milking animal receive feed and/or drink. While the milking animal actuates the valve, the milking animal has the position and/or attitude in the milking station which is suitable for locking said milking animal at the neck. Therefore, the milking animal can be held reliably and safely.

When separate feed and/or drinking troughs are used, the supply device is preferably configured to determine and/or detect the respective quantity of feed and/or water supplied to each of the feed and/or drinking troughs by the supply device. The quantity of feed and/or water supplied to each of the feed and/or drinking troughs can be used to derive the quantity of feed and/or water which the milking animals have eaten and/or drunk therefrom. Therefore, the feed and/or water consumption, and the feeding and/or drinking behavior of the milking animals can be monitored individually.

In this patent application, the term "water" or "drinking water" means every type of drink for milking animals. The water is of such a quality that the water is suitable for drinking by the milking animals. Possibly, a feed supplement and/or medication and/or other additives may be added to the water. In this patent application, water with such an additive is also referred to by the term "water" or "drinking water".

In one embodiment, the system comprises an animal identification system for identifying each milking animal which visits one of the milking stations. For example, the animal identification system comprises transponders which are arranged on each of the milking animals, for example on a collar around the neck of each milking animal, and also readout units for reading the transponders, wherein one of the readout units is arranged at each milking station. By means of the animal identification system, a milking animal visiting one of the milking stations can be identified. For example, by means of the control system it can be established whether said milking animal is ready for milking, i.e. whether or not it needs to be milked.

The readout units are preferably arranged at the head end of each milking station, wherein the control system is actively connected to the readout units of the milking stations. The control system is for example configured such that the neck lock device of each milking station is moved from the open state to the locked state on the condition that the readout unit of said milking station has read a transponder of one of the milking animals and the sensor means has sensed or detected that said milking animal has pushed its head above or into the feed and/or drinking trough of said milking station.

Although the readout units of the milking stations can identify the milking animals by means of the transponders, it cannot be accurately established whether the milking animals are in the correct position and/or attitude in the milking station for locking at the neck. The position and/or attitude which is suitable for locking at the neck can be detected by the sensor means for sensing whether the milking animal has pushed its head above or into the feed and/or drinking trough of said milking station. On the basis of the data from both the readout units and the sensor means, the control system determines whether the neck lock device is moved to the locked state in order to lock a milking animal at the neck. Thus the neck lock works particularly safely and reliably.

In one embodiment according to the invention, the milking stations, at the head ends thereof, preferably lying opposite the entry openings, are delimited by a fixed fence, wherein the neck lock devices of the milking stations are arranged on the fence, and wherein the at least one feed and/or drinking trough is positioned along and/or at a distance from the fence such that a milking animal present in one of the milking stations must push its head and/or neck through the fence in order to eat and/or drink from said feed and/or drinking trough. According to the invention, the fence along the head ends of the milking stations is stationary and/or at a fixed location. The neck lock device of each milking station is integrated with the fence or arranged on the fence. In this case, feed and/or water from the feed and/or drinking trough can only be reached by a milking animal which has pushed its neck and/or head through the fence in a milking station. This guarantees that each milking animal is standing at the correct position in the milking station and has the correct attitude for being held at the neck reliably and safely by means of the neck lock device.

In one embodiment according to the invention, each milking station is configured to receive a single milking animal at a time. The dimensions of the milking station are adapted to the length and width of a single milking animal. Only one milking animal at a time may be present in each milking station. The milking stations each comprise two long sides and two short sides. The entry opening of each milking station defines one of the short sides of the milking station. The milking stations are preferably arranged with their long sides next to each other. Viewed from above, the milking stations are elongate and are positioned with their long sides laterally next to each other. Preferably, the milking stations are adjacent to each other. For example, the milking stations are arranged parallel adjacent to each other laterally, i.e. the entry openings of the milking stations are substantially aligned relative to each other. The milking stations may however also be placed laterally next to each other in an arc, in particular following a circle arc. It is possible in this case that the long sides of the milking stations to some extent run tapering towards each other. The entry openings are preferably on the short sides which extend along the outer periphery, while the feed and/or drinking troughs are arranged on the short sides which lie on the inner periphery. For example, the milking stations are separated from each other on their long sides by fixed separating fences. The short sides of the milking stations lying opposite the entry openings are aligned along the fence. The fence delimits the milking stations at their head ends.

According to the invention, it is furthermore possible that at each milking station, the fence comprises two stationary, fixed fence parts arranged at a distance from each other to leave a central opening with a first width, in particular such that the neck of a cow fits in between as far as the shoulders, and wherein the neck lock device of each milking station comprises two retaining posts, which in the locked state determine between them a retaining opening with a second width which is smaller than the first width, in particular such that a cow which pushes its head through the retaining opening cannot withdraw its head therefrom. The second width, i.e. the width of the retaining opening, lies for example between 15-25 cm, e.g. around 20 cm. With such a retaining opening, a cow locked at the neck cannot withdraw its head fully from the retaining opening, but can still move to some extent in the longitudinal direction of the milking station. This freedom of movement is however limited by the fence parts which form a stop for the shoulders of the cow. The central opening and the retaining opening of each milking station, viewed in the longitudinal direction of said milking station, are spaced apart, such as at a distance of 20-80 cm. The cow can only move its neck forward through the retaining opening until its shoulders come to lie against the fence parts on either side of the central opening. This keeps the cow in place better, and facilitates the automatic connection of the milking cups to the teats of the cow.

In one embodiment, the neck lock device of each milking station comprises two retaining posts which are each pivotable about a respective pivot axis running in a substantially horizontal plane and obliquely relative to the longitudinal direction of said milking station. The pivot axes of the retaining posts are arranged for example at a maximum height of 50 cm calculated from the floor part of the milking station on which the milking animal stands with its front legs. The pivot axes, viewed in the longitudinal direction from the entry opening to the head end of the milking station, run obliquely outward. The angle between the pivot axis of each retaining post and the longitudinal direction of the milking station is for example between 10-40°. In the open state of the neck lock device, the retaining posts define a V-shaped opening which is relatively large. This is favorable for the willingness of a milking animal to push its head through the opening. After a milking animal has pushed its head between the retaining posts, the retaining posts pivot slightly forward when the neck lock device moves from the open state to the locked state. The milking animal does not or scarcely perceives the approach of the retaining posts, even from the corner of its eyes. This is favorable for the tranquility of the milking animal.

In one embodiment according to the invention, the actuator device of the neck lock device of each milking station comprises two pneumatic cylinders which are each configured to move one of the retaining posts. Each retaining post is for example connected by means of a pivot arm to one of the fence parts, wherein each pivot arm comprises two arm parts which are pivotably connected to each other. The pneumatic cylinder engages on one of the arm parts while the other arm part is provided with a protruding lip. On movement from the open state to the locked state, the pneumatic cylinder substantially aligns the arm parts. The protruding lip forms a stop for the end position of the arm parts, which have just been moved through the dead point. In this way, the forces exerted by the milking animals on the retaining posts are mechanically absorbed by the pivot arms instead of by the pneumatic cylinders, so that relatively light pneumatic cylinders can be used. To open the neck lock, the retaining posts are retracted again through the dead point by the pneumatic cylinders.

In one embodiment according to the invention, the system is configured such that the entry opening of each milking station which is not occupied by a milking animal is open for entry of a milking animal into said milking station, irrespective of whether said milking animal fulfils the milking criterion. The system is configured to allow each milking animal to enter the milking stations irrespective of whether said milking animal fulfils the milking criterion. The system does not use an admittance criterion for allowing a milking animal to enter one of the milking stations. The milking stations which are empty, i.e. not occupied by a milking animal, are totally freely accessible to the milking animals in the accommodation space. A milking animal in the accommodation space may enter a free milking station via the open entry opening without for example an access gate of the milking station first needing to be opened. Each open entry opening can be reached individually via a walkable connection from the accommodation space.

In particular, each of the entry openings of the milking stations is permanently open. In this case, none of the milking stations has an access gate which can be operated by an actuator device between an open state in which the entry opening is open, and a closed state in which the entry opening is closed. This encourages the milking animals to visit the milking stations with the feed and/or drinking trough, so that the visit frequency of the milking animals to the milking stations is particularly high. Incidentally, according to the invention, it is not excluded that a milking station is taken out of use by closing the entry opening of said milking station, so that the milking station is no longer accessible to the milking animals, for example for maintenance or cleaning activities in said milking station. The term "permanently open" means that the entry openings of the milking stations which are normally in use always remain open.

In one embodiment according to the invention, the control system is configured, if a milking animal which does not fulfil the predefined milking criterion is locked at a point in time at the neck in a milking station by the neck lock device of said milking station, to move the neck lock device of said milking station by means of the actuator device from the locked state to the open state after expiry of a, preferably predefined, period following said point in time. When a milking animal enters one of the milking stations and then assumes the position and/or attitude suitable for the neck lock, for example pushes its head above or into a feed and/or drinking trough of said milking station, according to the invention, said milking animal is locked at the neck by operation of the neck lock device from the open state to the locked state, irrespective of whether or not said milking animal is ready for milking. In other words, also if the milking animal is not ready for milking, the milking animal is locked at the neck. Since the milking animal which is not ready for milking need not be milked, said milking animal is locked at the neck only to condition said milking animal. When a milking animal which is not ready for milking is secured in a milking station by operation of the neck lock device from the open state to the locked state, said milking animal may be released again after a predefined period calculated from the point in time at which said milking animal was locked at the neck. The predefined period lies for example between 1-60 seconds, preferably between 5-20 seconds. Such a period is sufficient to enable the milking animals to become accustomed to the neck lock, so that the milking animals remain quiet also if the milking animals are secured locked at the neck for longer periods in a milking station, in particular during milking.

In one embodiment according to the invention, the control system is configured, if a milking animal which fulfils the predefined milking criterion is locked at a point in time at the neck in a milking station by the neck lock device of said milking station, to keep said milking animal locked at the neck in said milking station while the milking system milks said milking animal, and, after said milking animal has been milked, to move the neck lock device of said milking station from the locked state to the open state by means of the actuator device. The control system is connected to the milking system or forms part of the milking system. When a milking animal ready for milking enters one of the milking stations and assumes the position and/or attitude suitable for being locked at the neck, for example pushes its head above or into a feed and/or drinking trough of said milking station, according to the invention, said milking animal is locked at the neck by operation of the neck lock device from the open state to the locked state. Since the milking animal ready for milking must be milked, the neck lock device remains locked until the milking of said milking animal is completed. Only after completion of the milking and disconnection of the milking cups is the neck lock device operated from the locked state to the open state to release said milking animal. Preferably, the milking animal is released only after some time, for example 5-30 minutes, after the milking cups have been disconnected, so that the teat openings can recover. Evidently it is however also possible that the milking animal is released immediately after milking, so that the milking animal is not held at the neck longer than necessary.

In a preferred embodiment according to the invention, the milking stations comprise at least three milking stations, preferably at least four or five or six or seven or eight milking stations. In particular, the ratio between the number of milking animals to be kept in the accommodation space and the number of milking stations is important. If the accommodation space is configured to contain a predefined number of milking animals, the number of milking stations is preferably adapted to the predefined number of milking animals, such that the system comprises at least one milking station for every 20 milking animals, preferably at least one milking station for every 15 milking animals, further preferably at least one milking station for every 12 milking animals, and most preferably at least one milking station for every 10 milking animals. In other words, the accommodation space is preferably configured to keep a group of a milking animals in the accommodation space, while the milking stations comprise at least q milking stations, wherein $a=q*b+r$ with 0 r b and b 30, preferably b 20 and more preferably b 12, in particular b 10. The number of milking stations according to the invention is relatively large. Thus in practice, it never occurs or rarely occurs that all milking stations are occupied by milking animals at the same time. The number of milking stations according to the invention is selected such that, in practice, almost always one or more milking stations remain free. Consequently, it is guaranteed that the milking animals always or almost always have unrestricted access to the milking stations.

The feature the accommodation space is configured to keep a predefined number of milking animals means that the accommodation space is designed to keep a predefined number of milking animals, such as 60-70 milking animals, during the lactation phase, wherein for example the surface area ($m^2$) of the accommodation space and the number of facilities in the accommodation space is adapted to said predefined number of milking animals to be kept. If the accommodation space comprises lying stalls, the number of lying stalls is for example substantially equal to the number of milking animals to be kept, i.e. an accommodation space for containing a group of for example 60 milking animals, preferably comprises approximately 60 lying stalls. In general, in such an accommodation space only one generally known milking robot is installed—a single milking robot for 60 milking animals is normal in practice. According to the invention, the ratio between the number of milking stations and the number of lying stalls is however much greater. In one embodiment in which the accommodation space comprises a number of lying stalls for the milking animals, the system according to the invention comprises at least one milking station for every 20 lying stalls, preferably at least one milking station for every 15 lying stalls, more preferably at least one milking station for every 12 lying stalls, and most preferably at least one milking station for every 10 lying stalls, i.e. for example an accommodation space with 60 lying stalls comprises, according to the invention, 6 or more milking stations. The feed facilities of the accommodation space, such as one or more concentrate feeding stations and the length of the feed fence, are also adapted to the number of milking animals to be kept in the accommodation space.

According to the invention, it is preferred that the automatic milking system for automatic milking of milking animals present in the milking stations comprises milking cups and a robot device which is movable relative to the milking stations, such that in each milking station, by means of the robot device, milking cups can be connected automatically to the teats of a milking animal present in said milking station. In the prior art, normally the aim is to achieve as high a utilization level as possible of a milking robot. The milking robot is relatively expensive, so its capacity must be utilized as optimally as possible. With the system according to the invention, the number of milking stations is such that, in practice, almost always one or more milking stations are free. Nonetheless, the system according to the invention is profitable because relatively costly components are shared by several milking stations. The robot device according to the invention is movable so it can connect milking cups in every milking station, whereby each milking station need not have its own robot device. The costs per milking station according to the invention are relatively low due to the use of a common robot device for the milking stations. Thus there is no economic obstacle to having free milking stations, and the system can economically be designed with an excess number of milking stations.

According to the invention, the robot device can be configured in various ways. In one embodiment, the robot device comprises an autonomous, self-propelled trolley, wherein the milking cups are arranged on the trolley and wherein the trolley is configured to travel to each milking station, and wherein the trolley is configured for the automatic connection of the milking cups of the trolley to the teats of a milking animal present in said milking station. For example, each milking station comprises a floor on which a milking animal can stand, and the system furthermore comprises an animal-free space which extends on the side of the milking stations opposite the accommodation space, wherein the animal-free space comprises a floor which is connected to the floor of each milking station via a connection through which the trolley can travel. Initially for example, the trolley is on the floor of the animal-free space. When a milking animal must be milked in one of the milking stations, the milking system controls the trolley such that the trolley automatically travels over the floor of the animal-free space to the floor of the milking station, up to below the teats of the milking animal. The trolley is autonomous and self-propelled, i.e. the trolley comprises a drive and steering system for driving and steering the trolley. The drive and steering system preferably comprises at least one electric motor. When the trolley has travelled to below the animal ready for milking, the milking cups are automatically connected to the teats of said milking animal. The milking animal is milked while the milking cups are connected. After the milking animal has been milked, the trolley can travel back to the floor of the animal-free space. The trolley is then again ready for a following milking in another or possibly the same milking station.

In an alternative embodiment, the robot device comprises a robot arm which is provided with a first arm part which is movably connected to a fixed supporting structure, and also at least one second arm part which is movably connected to the first arm part. For example, the first arm part is connected to the supporting structure pivotably about a pivot axis running substantially vertically, for example by means of a ball joint, wherein the second arm part is connected telescopically movably to the first arm part. In this case, the milking stations may be positioned around the pivot axis, i.e. the milking stations lie laterally next to each other following a circle arc, such that the milking stations are oriented with their head sides towards the pivot axis. By moving the first arm part about the pivot axis, the robot arm can be aligned with each of the milking stations for connecting the milking cups in each milking station.

The robot arm may however also be guided movably along a guide rail which extends transversely relative to the long sides of the milking stations arranged next to each other. In this case, the robot arm is movable rectilinearly along the guide rail, so that the robot arm can connect the milking cups in each milking station. The robot arm may comprise a milk discharge line with which the milk is discharged from the milking cups. Such a robot arm for connecting milking cups may be designed and produced reliably using techniques known in themselves in practice.

According to the invention, it is possible that the robot arm is provided with the milking cups. The milking cups are arranged on the robot arm. The milking cups are connected to the robot arm, and the robot arm can connect the milking cups of the robot arm one by one to the teats of a milking animal. Such a robot arm may be produced and used particularly reliably.

In addition, it is possible that the milking system is provided with a milking cup holder which is configured for receiving milking cups which are not being used, wherein the robot arm is provided with at least one gripper member which is configured to take at least one milking cup from the milking cup holder, and connect it to a teat of a milking animal present in one of the milking stations. In this case, the robot arm takes a first milking cup from the milking cup holder and connects said milking cup to a teat, then the robot arm takes a second milking cup from the milking cup holder, and so on. Such a robot arm is comparable to a robot arm of a generally known milking robot and may be produced and used reliably.

Each milking station may comprise a set of milking cups for connection to the teats of a milking animal present in the milking station. Also, the milking cups may for example be arranged in sets in the animal-free space in front of each milking station. It is also possible that a common set of milking cups is shared by several milking stations. The milking cups are then used successively in several milking stations.

The invention also relates to a method for milking a group of milking animals, in particular cows, in a system as described above, wherein the method comprises:
 determining, by means of the control system, whether a milking animal which has entered a milking station assumes in said milking station a position and/or attitude which is suitable for locking said milking animal at the neck by the neck lock device of said milking station, if the milking animal which has entered the milking station has or assumes the predefined position and/or attitude suitable for locking said milking animal at the neck by means of the neck lock device of said milking station, controlling the actuator device of the neck lock device of said milking station by means of the control system such that said milking animal is locked at the neck by the neck lock device of said milking station irrespective of whether said milking animal fulfils the milking criterion.

The method according to the invention has the same technical advantages as described above in relation to the system according to the invention.

The invention will now be explained in more detail below with reference to the attached drawing.

FIGS. 4a-4d show side views of one of the milking stations of the system shown in FIG. 1, in which a milking animal is secured and milked.

FIG. 7 shows a side view in cross section along line VII-VII from FIG. 4a.

Several inventions are contained in the exemplary embodiments shown. In this description of the figures, several inventions and features thereof are described. Although the exemplary embodiments show these features in combination, these features have significance alone, i.e. these features can be applied independently of each other. In addition, a system according to the invention need not have all features in combination; a system according to the invention may also contain only a number of these features. In other words, a system according to the invention may contain all possible combinations of one or more of these features.

Figure 1:
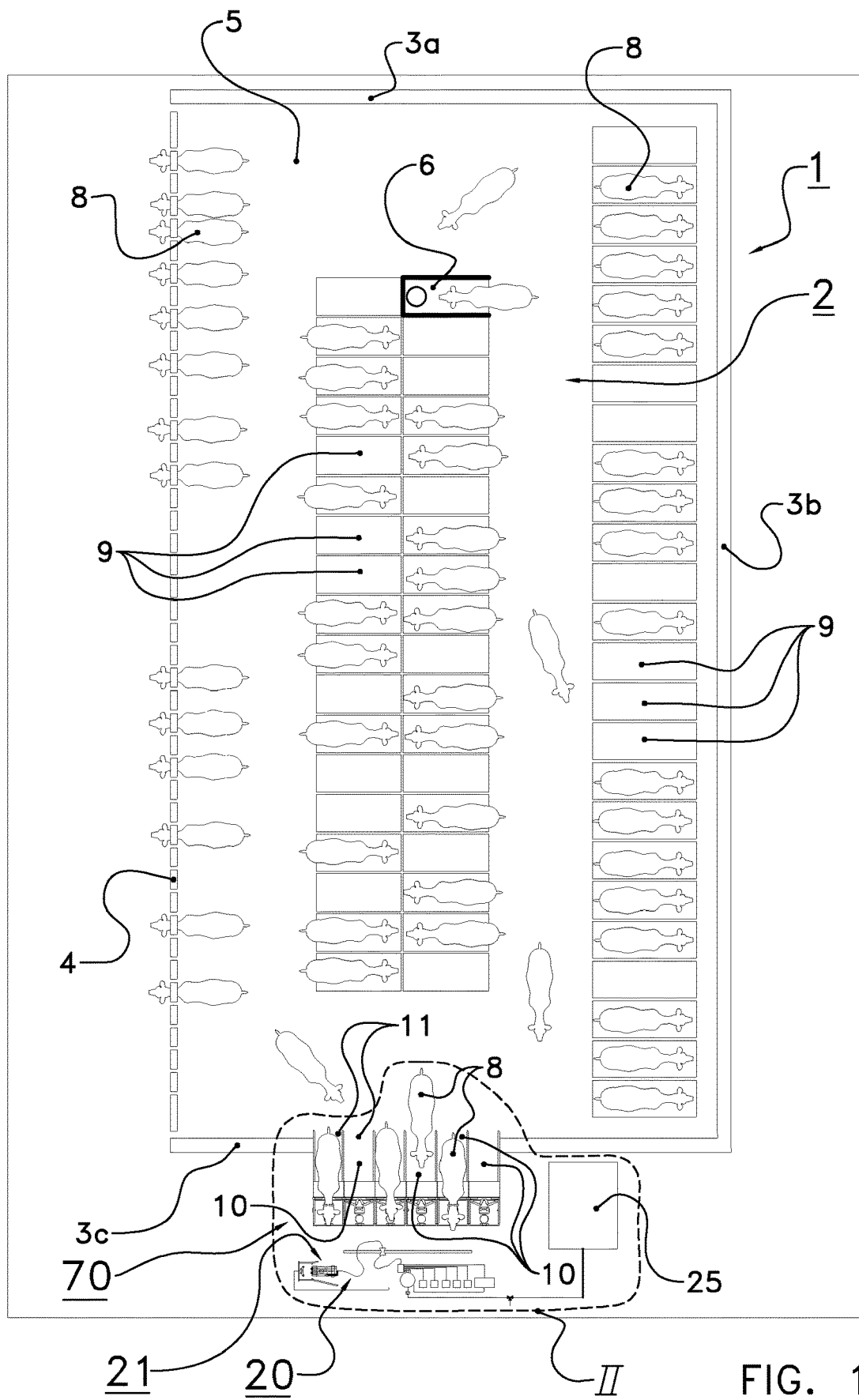
FIG. 1 shows a diagrammatic top view of a first embodiment of a system according to the invention.

The system shown in FIG. 1 for milking a group of milking animals, in this exemplary embodiment cows 8, is indicated as a whole with 1. The system 1 comprises an accommodation space 2 which is fenced off by walls or fencing 3a, 3b, 3c and a feed fence 4. The accommodation space 2 is stationary, i.e. immovable, in particular non-rotatable. The accommodation space 2 comprises a fixed floor 5, for example a grating or grid floor or a solid floor. The accommodation space 2 is formed by a barn space, i.e. the cows 8 are inside the barn. The accommodation space 2 may be connected via a selection gate to another accommodation space such as a separation space or a grazing space (not shown).

The accommodation space 2 comprises a feed area for feeding the milking animals, which in this exemplary embodiment is formed by a feed fence 4 and a concentrate feeding station 6. The accommodation space 2 comprises a rest area for resting the cows 8. In this exemplary embodiment, the rest area is formed by lying stalls 9 in which the cows 8 can lie down. The rest area may however also be configured without lying stalls.

The accommodation space 2 is configured to keep a predefined number of cows during the lactation phase. The surface area (m$^2$) of the accommodation space 2 and the facilities in the accommodation space 2 are adapted to the predefined number of cows to be kept. Since almost all cows rest overnight in the accommodation space, in general one lying stall 9 per cow 8 for example is considered the norm, i.e. the number of lying stalls 9 is substantially equal to the number of cows to be contained. In this exemplary embodiment, the accommodation space 2 is configured to keep 60 cows, and the accommodation space 2 therefore comprises 60 lying stalls. Also, for example, the feed facilities of the accommodation space 2, such as the length of the feed fence 4, are adapted to the number of cows to be contained in the accommodation space 2. In this exemplary embodiment, the system 1 comprises six milking stations 10, i.e. there is one milking station per ten cows 8. The number of milking stations 10 may however be greater or smaller, for example the system 1 may also have seven or eight milking stations 10, or four or five milking stations 10. If the accommodation space 2 is configured for more or fewer than 60 cows 8, the number of milking stations 10 is adapted accordingly. The number of milking stations 10 is matched to the number of milking animals to be kept, such that the system 1 comprises at least one milking station 8 for every 20 milking animals 8, preferably at least one milking station 10 for every ten milking animals 8.

Figure 2:
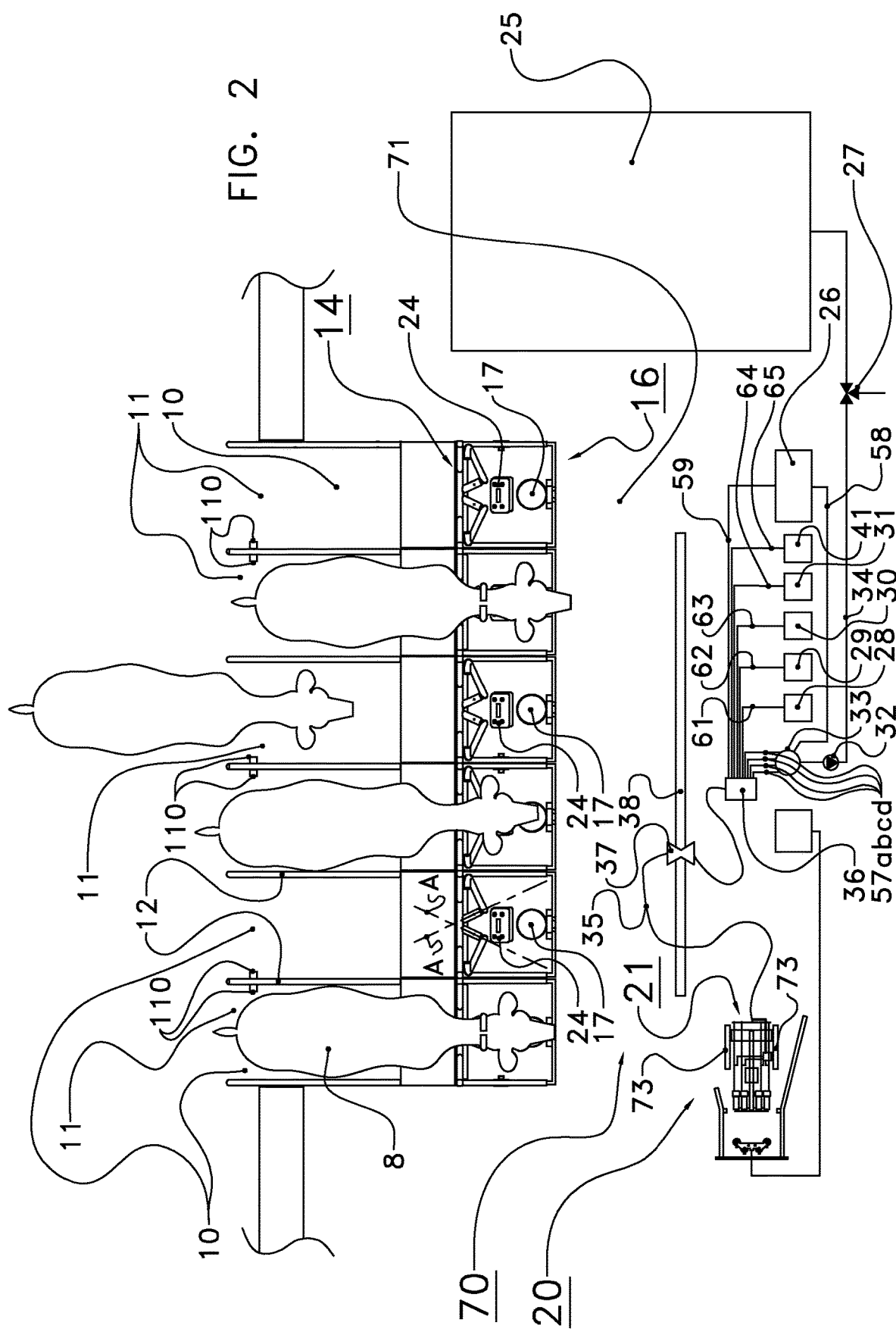
FIG. 2 shows an enlarged detail II of FIG. 1.

The milking stations 10 are each arranged at a fixed location and laterally next to each other. Each milking station 10 has two long sides and two short sides; the milking stations 10 are each elongate. The milking stations 10 are arranged with the long sides laterally adjacent to each other (see FIGS. 1 and 2). In FIGS. 1 and 2, the milking stations 10, seen in top view, are substantially rectangular. The milking stations 10 may however also be configured differently. For example, the milking stations may be placed next to each other following a circle arc (not shown).

Figure 3A:
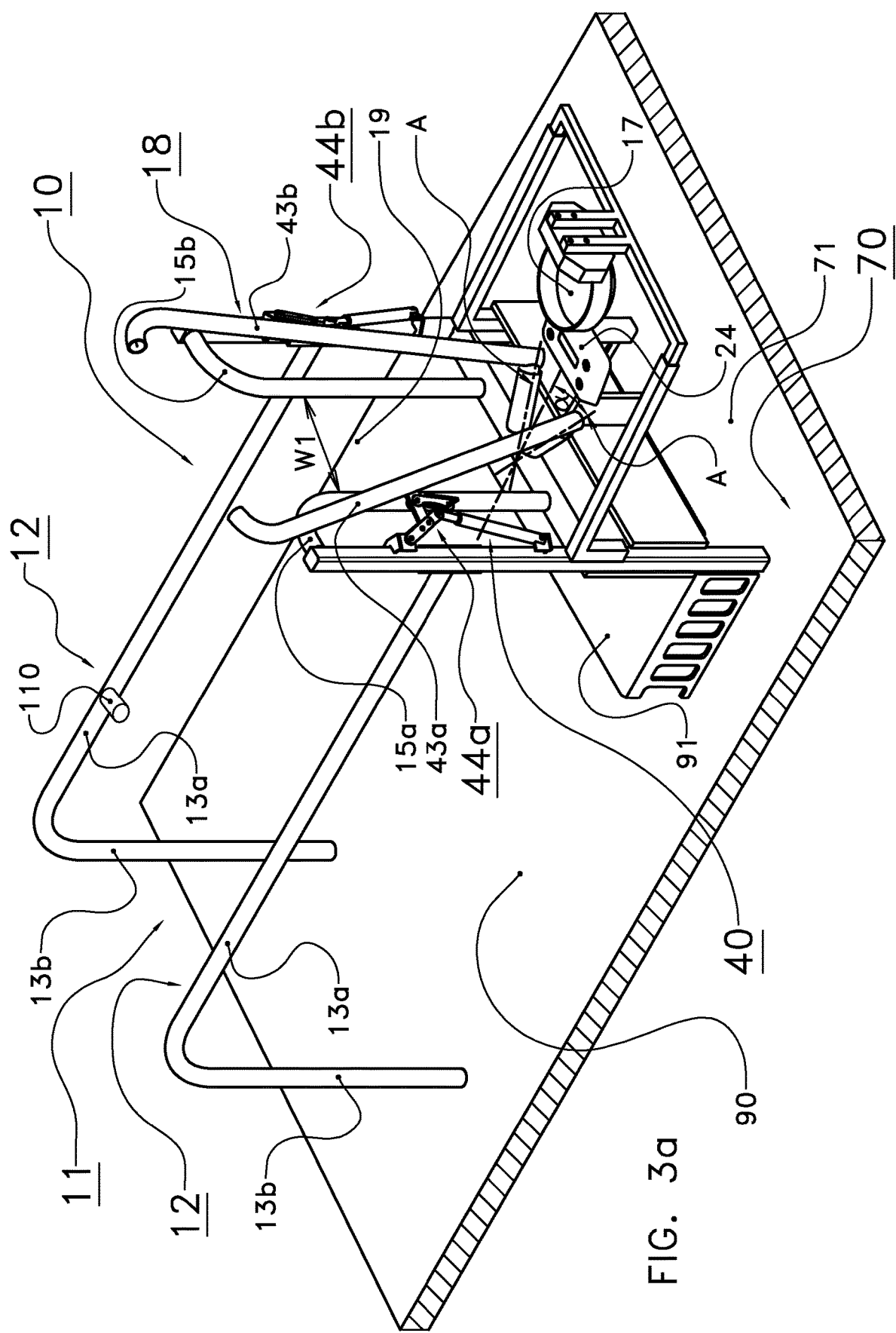
FIGS. 3a and 3b show perspective views of one of the milking stations of the system shown in FIG. 1, wherein the neck lock device is respectively in the free state and in the locked state.
Figure 3B:
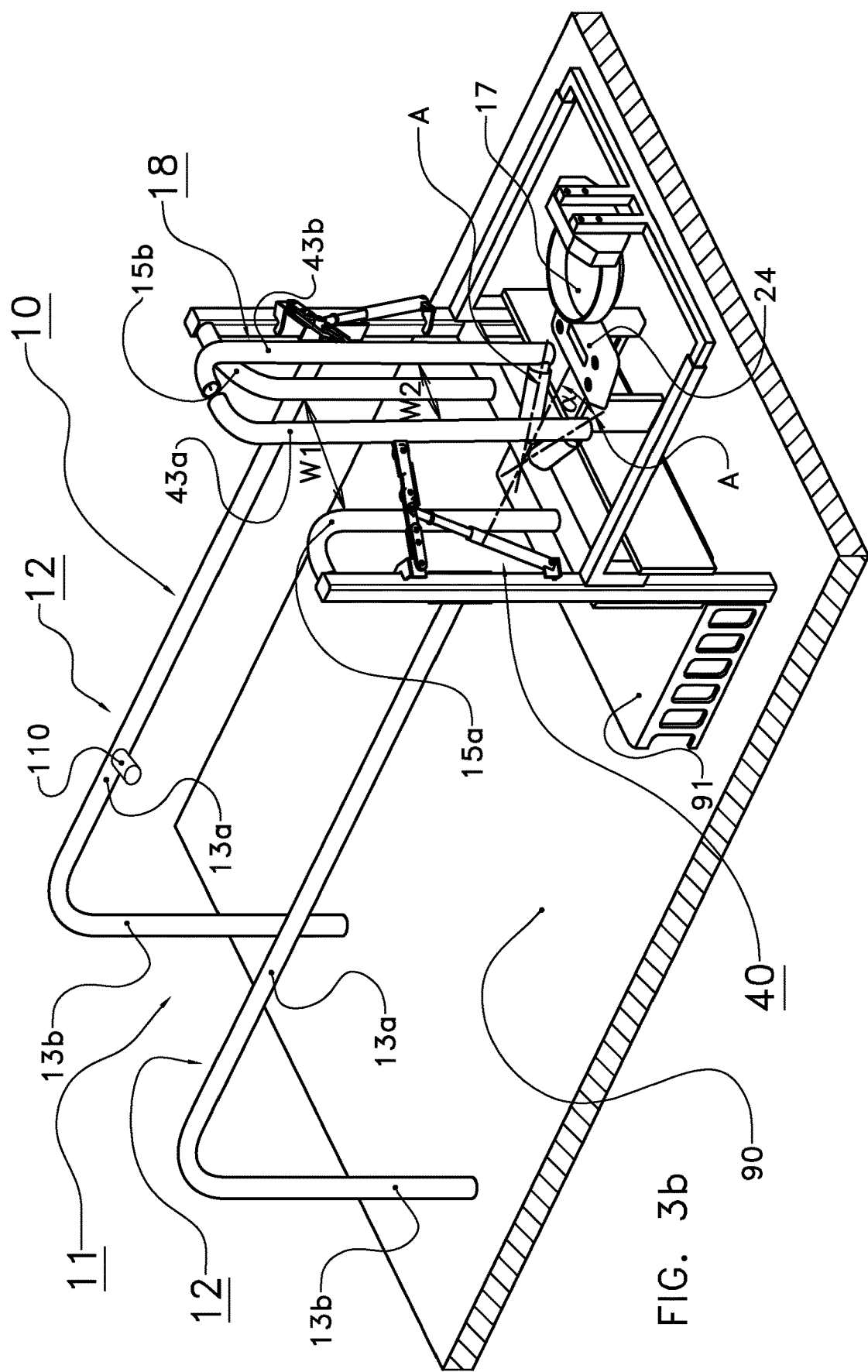

The milking stations 10 are mutually separated by separation fences 12 formed by a horizontal and a vertical bar part 13a, 13b (see FIGS. 2, 3a and 3b). The horizontal bar part 13a is relatively low, for example around 60-120 cm high. The cows 8 in adjacent milking stations 10 stand closely next to each other and have mutual contact because the milking stations 10 are only separated from each other by the open separation fences 12. In this way, the herding behavior of the cows in the milking stations 10 is reinforced.

The milking stations 10 each comprise an entry opening 11 for entry of a cow 8 from the accommodation space 2 to the milking station 10. The entry opening 11 of each milking station 10 is arranged on one of the short sides of the milking station 10. As shown most clearly in FIGS. 2, 3a and 3b, none of the milking stations 10 has an access gate which is operated by an actuator device between an open state in which the entry opening 11 is open, and a closed state in which the entry opening 11 is closed. The entry openings 11 of the milking stations 10 are each open permanently. Incidentally, according to the invention, it is not excluded that a milking station is taken out of use by closing the entry opening of that milking station, so that the milking station is no longer accessible to milking animals, for example for maintenance or cleaning activities in that milking station. During normal operation, the entry openings 11 are however permanently open. If a milking station 10 is not occupied by a cow 8, there is no obstacle to one of the cows 8 entering said milking station 10 from the accommodation space 2. The unoccupied milking stations 10 are totally freely accessible for the cows 8.

On the short sides or head ends opposite to the entry openings 11, the milking stations 10 are mutually aligned along a fixed fence 14 (see FIG. 2). In this exemplary embodiment, the fence 14 for each milking station 10 has two fence parts 15a, 15b which, viewed in the transverse direction of the milking station 10, are arranged spaced apart from each other, leaving free a central opening 19 with a first width $w_1$ such that the neck of a cow 8 can pass through as far as the shoulders. A cow 8 can enter a milking station 10 until the shoulders of the front legs of the cow 8 come to rest against the fence parts 15a, 15b on either side of the central opening. Since the fence parts 15a, 15b are arranged fixedly, a cow 8 can only leave each milking station 10 by walking backward again through the entry opening 11. The entry opening 11 therefore also forms an exit opening.

Each milking station 10 furthermore comprises a neck lock device 18 which, in this exemplary embodiment, is arranged on the fence parts 15a, 15b. The neck lock device 18 of each milking station 10 can be operated by an actuator device 40 between a locked state or secured state (see FIGS. 3b and 3d), in which a cow 8 in the milking station 10 is held by the neck and hence secured and/or held in the milking station 10, and an open state (see FIGS. 3a and 3c), in which a cow 8 is free to move its head in and out of the neck lock device 18 and is free to leave the milking station 10. Thus the neck lock device 18 of each milking station 10 can be actively operated. The neck lock device 18 will be described in more detail below.

In this exemplary embodiment, the milking stations 10 have a drinking system 16 which is configured to provide water for the milking animals 8. The drinking system 16 comprises a plurality of drinking troughs 17; each milking station 10 is provided with its own drinking trough 17. The drinking troughs 17 are connected by a pipe system to a water supply, for example a water mains connection. Water from the water mains connection is supplied via the pipe system to the drinking troughs 17. The water in the separate drinking troughs 17 remains relatively fresh, which is favorable for the drinking behavior of the milking animals. It is however also possible that several milking stations 10 have a common drinking trough, or even that a single drinking trough is provided for all milking stations 10 (not shown).

The drinking trough 17 of each milking station 10 is positioned at a distance behind the fence parts 15a, 15b of said milking station 10, such that a cow 8 in said milking station 10 must push its head and neck through the central opening 19 between the fence parts 15a, 15b, and through the neck lock device 18 in the open state, in order to drink water from the drinking trough 17. In other words, the drinking system 16 is configured such that water can only be reached by a cow 8 in a milking station 10 which has pushed its head and neck through the neck lock device 18 in the open state. In this way, a cow 8 in a milking station 10 which wishes to drink is secured safely and reliably at the neck by the neck lock device 18 of said milking station 10. This will be explained further below.

In order to identify the cows in the milking stations 10, the system 1 has an animal identification system, known in itself, for identifying each milking animal which visits one of the milking stations. The animal identification system comprises for example transponders 23 which are attached to collars worn by the cows 8, and readout units 24 for reading the transponders 23. The readout units 24 are arranged at the head end of each milking station 10, in particular along the fence 14 (see FIG. 2). When a cow 8 walks into one of the milking stations 10 and then pushes its head through the fence 14, the transponder 23 in the collar of the cow 8 is read by the readout units 24 of said milking station 10, so that the cow 8 is identified. A control system 41, for example comprising a computer, laptop and/or smartphone, is actively connected to the readout units 24. The identity of the identified cow 8 is entered in the control system 41.

The cows can be milked in the milking stations 10 by an automatic milking system 20. With an automatic milking system, the cows voluntarily go to the milking stations 10 to be milked. The automatic milking system 20 comprises milking cups 22. The milking system 20 is configured to connect the milking cups 22 automatically to the teats of a cow 8 in a milking station 10, and to milk said cow 8 automatically provided that said cow 8 complies with a predefined milking criterion, i.e. is ready for milking. The milking system 20 comprises the control system 41 or is actively connected therewith. The control system 41 determines whether a cow 8 which is identified on a visit to a milking station 10 fulfils the milking criterion, i.e. must be milked. Different milking criteria are possible, for example on the basis of the time which has elapsed since the last milking of the cow, or on the basis of the expected milk yield, which is dependent on the time since the last milking and the milk production rate in the udders, which can be calculated from historical data from previous milkings of the cow, or still other milking criteria.

The milking stations 10 are placed adjacent to an animal-free space 70 which is closed for the milking animals present in the accommodation space 2. The animal-free space 70 forms a "clean" space, i.e. the cows 8 have no access to the animal-free space 70 and cannot walk there. The animal-free space 70 has a substantially flat floor 71. Various components of the milking system 20 are arranged in the animal-free space 70. This will be explained further below.

The automatic milking system 20 comprises a robot device which is movable relative to the milking stations 10 such that, in each milking station 10, milking cups 22 can be connected automatically by means of the robot device to the teats of a cow 8 present in said milking station 10. The robot device may be configured in various ways, for example as an autonomous self-propelled trolley with milking cups 22 (see FIGS. 1, 2 and 4a-4d) or as a robot arm (see for example FIGS. 5 and 6a-6c). The various embodiments of the automatic milking system 20 will be described in more detail below.

In the exemplary embodiment shown, the drinking system 16 of the milking stations 10 is the only drinking facility for the cows in the accommodation space 2. In other words, the cows in the accommodation space 2 can only drink from the drinking troughs 17 of the milking stations 10. In order to drink, the cows must visit the milking stations 10. Since the cows 8 must always drink water, the visit frequency to the milking stations 10 is more than sufficient for milking two or three times per day by means of the automatic milking system 20. Thus it is not necessary or scarcely necessary to collect the cows manually for milking. This is a particularly great advantage since, in the prior art, collecting cows which do not voluntarily visit a milking robot, requires manual labor.

Although the cows can only drink in the milking stations 10, at the same time the water intake of the cows necessary for milk production is guaranteed. The number of milking stations 10 according to the invention is relatively great. As indicated above, the accommodation space 2 in this exemplary embodiment is configured to keep a predefined number of 60 milking animals. In the prior art, it is normal to place only one milking robot in such a production group. According to the invention however, six milking stations 10 are provided. With such a number of milking stations, in practice it does not occur or rarely occurs that all milking stations 10 are occupied by cows simultaneously. Even if cows not ready for milking occupy milking stations 10 for drinking without being milked, almost always one or more milking stations 10 remain free in which other cows can drink. Consequently, it is guaranteed that the cows always or almost always have unrestricted access to water.

At the same time, it is economically viable to have a relatively large number of milking stations 10 because the costs per milking station 10 are particularly low, since the relatively costly components of the automatic milking system 20, i.e. the robot device, are shared by the milking stations 10. The robot device is movable relative to the milking stations 10 such that, in each milking station 10, milking cups 22 can be connected automatically by means of the robot device to the teats of a cow 8 present in said milking station 10.

The drinking system 16 of the milking stations 10 is furthermore configured to make water available, in particular in unlimited quantities (ad libitum), for each cow present in one of the milking stations 10, irrespective of whether or not said cow 8 fulfils the milking criterion. In other words, each cow visiting one of the milking stations 10 can drink in said milking station 10, irrespective of whether or not said cow 8 is ready for milking. In this way, the cows are conditioned to associate the milking stations 10 primarily with drinking, and only secondarily with milking. The milking stations 10 form drinking stations for the cows. Consequently, the cows 8 are further encouraged to visit the milking stations 10 voluntarily.

To facilitate the access to water further, the permanently open entry openings 11 of the milking stations 10 can be reached freely and/or unhindered via a walkable connection from the feed fence 4, the concentrate feeding station 6 and from the lying stalls 9 in the accommodation space 2. The accommodation space 2 is configured such that the cows can walk around freely in the accommodation space 2 between the feed fence 4, the lying stalls 9 and each entry opening 11. Totally free cow traffic is possible between the feed fence 4, the lying stalls 9 and the entry openings 11. To drink water, the cows in the accommodation space 2 are able to walk to the drinking system 16 of the milking stations 10 without compulsion and without hindrance.

Therefore with the system according to the invention, not only is it guaranteed that every cow 8 visits the milking stations 10 frequently, whereby no cows or few cows need be collected for milking, but also water is available so easily that the water consumption of the cows is comfortably sufficient for optimum milk production.

Although, in this exemplary embodiment, the drinking system 16 is the only drinking facility for the cows 8 in the accommodation space 2, the system according to the invention may comprise a further drinking facility, for example a drinking trough in the accommodation space 2. The capacity of the further drinking facility is then however selected small enough that, in order to meet their daily water needs, the cows must still visit the milking stations 10.

In this exemplary embodiment, the neck lock device 18 of each milking station 10 (see FIGS. 3a-3d) comprises two retaining posts 43a, 43b, which are each pivotable about a respective pivot axis A (see also FIG. 2) which runs substantially in a horizontal plane, obliquely relative to the longitudinal direction of the milking station 10. The pivot axes A of the retaining posts 43a, 43b are for example arranged at a height of 30 cm. The angle between the pivot axis A of each retaining post 43a, 43b and the longitudinal direction of the milking station 10 is around 30° in this exemplary embodiment.

Figure 3C:
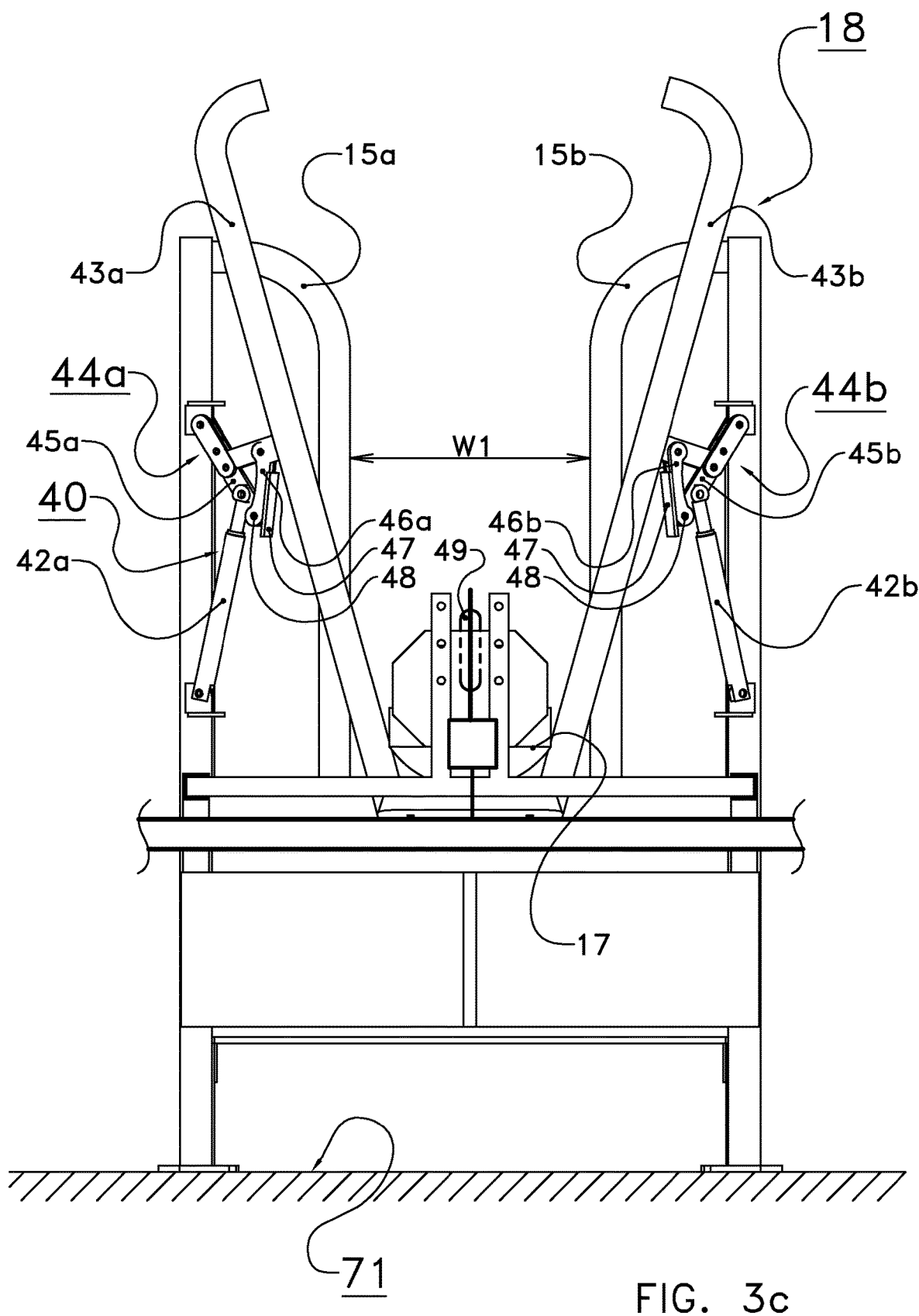
FIGS. 3c and 3d show front views of the milking station shown in FIGS. 3a and 3b.
Figure 3D:
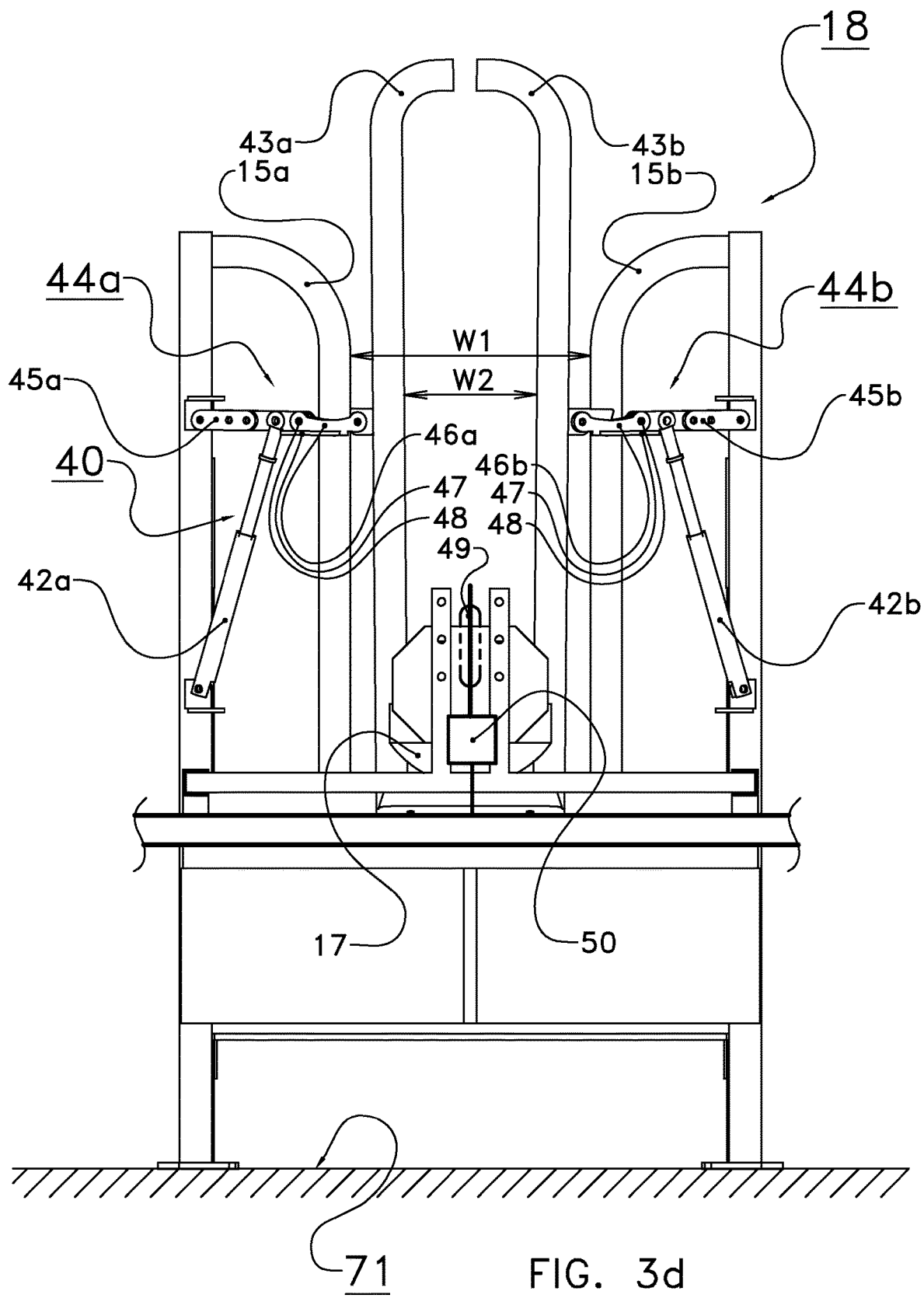

As shown in FIGS. 3a and 3c, in the open state of the neck lock device 18, the retaining posts 43a, 43b define a V-shaped opening. A cow 8 walking into the milking station 10 first pushes its head through the central opening 19 between the fence parts 15a, 15b, and through the V-shaped opening to reach the drinking trough 17. The V-shaped opening is relatively large so that the cow 8 is encouraged to drink from the drinking trough 17. In the locked state shown in FIGS. 3b, 3d, the retaining posts 43a, 43b run substantially vertically. Between them is a retaining opening with a second width $w_2$ which is smaller than the first width $w_1$ of the central opening 19 between the fence parts 15a, 15b. The width $w_2$ of the retaining opening is such that a cow 8 which pushes its head through the retaining opening cannot then withdraw it.

The width $w_2$ of the retaining opening is for example 195 mm. With such a width $w_2$, a cow 8 locked at the neck cannot withdraw its head fully from the retaining opening, but can still move to some extent in the longitudinal direction of the milking station 10. This freedom of movement is however limited by the fence parts 15a, 15b which form a stop for the shoulders of the cow 8. The cow 8 can only move its neck forward through the retaining opening until the shoulders of its front legs come to lie against the fence parts 15a, 15b. By restricting the freedom of movement of the cow in the milking station 10, the automatic connection of the milking cups 22 to the teats of the cow 8 becomes easier.

The retaining posts 43a, 43b are each connected to one of the fence parts 15a, 15b by means of a hinge arm 44a, 44b. Each hinge arm 44a, 44b consists of two arm parts 45a, 46a and 45b, 46b respectively, which are mutually pivotably connected by means of a hinge 48. As described above, the neck lock device 18 is actively movable by means of the actuator device 40 between the locked state (see FIGS. 3b and 3d) and the open state (see FIGS. 3a and 3c). In this exemplary embodiment, the actuator device 40 of each neck lock device 18 comprises two pneumatic cylinders 42a, 42b for moving the respective retaining posts 43a, 43b. To control the pneumatic cylinders 42a, 42b, these are actively connected to the control system 41.

The pneumatic cylinders 42a, 42b engage one of the arm parts 45a, 45b of the hinge arms 44a, 44b. The other arm parts 46a, 46b each comprise a protruding lip 47 which forms a stop for the locked state. When the pneumatic cylinders 42a, 42b are extended, the retaining posts 43a, 43b move from the open state to the locked state, wherein, because of the obliquely running pivot axes A, the retaining posts 43a, 43b at the same time move slightly forward. When the cow 8 is enclosed, the retaining posts 43a, 43b approach the neck of the cow 8 not only from the side but also to some extent from the rear, so that the cow 8 does not or scarcely perceives the movement of the retaining posts 43a, 43b, even from the corner of its eye. This helps keep the cow 8 quiet during application of the neck lock.

The pneumatic cylinders 42a, 42b push the arm parts 45a, 45b through a dead point until the lips 47 of the arm parts 46a, 46b come to lie against the arm parts 45a, 45b. The retaining posts 43a, 43b have then reached the locked state. The pneumatic cylinders 42a, 42b need not be dimensioned to absorb, in the locked state, forces which the cow 8 may exert to free itself from the neck lock. Such forces are dissipated mechanically via the hinge arms 44a, 44b. To open the neck lock 18, the retaining posts 43a, 43b are retracted again through the dead point by the pneumatic cylinders 42a, 42b.

As described above, the drinking troughs 17 of the drinking system 16 are configured to provide water for the cows 8. In this exemplary embodiment, each drinking trough 17 is provided with a flap or tongue 49, known in itself and operated by the cow, which forms a supply valve. The flap 49 is pretensioned in a closed state. When a cow 8 presses its nose against the flap 49, the flap 49 is moved to an open state and water flows into the drinking trough 17. A sensor 50, for example a flow meter, is provided in the supply line to the drinking trough 17 (see FIGS. 4a-4d). The sensor 50 is actively connected to the control system 41. On the basis of the sensor 50, it is perceived when the cow 8 presses its nose against the flap 49. The sensor 50 forms a detection means for detecting whether the cow 8 in a milking station 10 has pushed its head into the drinking trough 17 of said milking station 10. The detection means may however also be configured differently, for example with a sensor for detecting whether a light beam is interrupted. It is also possible that the detection means is configured to detect whether the cow in a milking station 10 has brought its head above the drinking trough 17, instead of in the drinking trough 17.

In this exemplary embodiment, the sensor 50 configured as a flow meter measures the quantity of water supplied to each drinking trough 17. On the basis of the quantity of water supplied, the control system 41 can deduce how much water the cows 8 have drunk during a visit to the milking station 10. Therefore the water consumption and drinking behavior of the cows 8 can be monitored individually.

A cow 8 which visits the milking station 10 to drink water from the drinking trough 17 pushes its head through the V-shaped opening between the retaining posts 43a, 43b. The transponder 23 in the collar of the cow 8 is read by the readout unit 24 of said milking station 10, so that the cow 8 is identified. Although the readout unit 24 can indeed identify the cow 8 by means of the transponder 23, it cannot be accurately established whether the cow 8 is in the correct position and/or attitude for locking at the neck in the milking station 10. The correct position and/or attitude in the milking station 10 can however be established using the sensor 50. When, after identification by the transponder 23, the cow 8 operates the flap 49 of the drinking trough 17 with its nose, the control system 41 via the sensor 50 establishes that the head of the cow 8 is in the drinking trough 17 and the cow 8 therefore has a position and/or attitude in the milking station 10 which is suitable for locking the cow 8 at the neck by means of the neck lock device 18 of said milking station 10.

When the control system 41 has established that the cow 8 in the milking station 10 has a position and attitude which is suitable for locking said cow 8 at the neck, the control system 41 controls the actuator device 40 of said milking station 10 such that the cow 8 is locked at the neck. The control system 41 for controlling the pneumatic cylinders 42a, 42b is configured and programmed such that the retaining posts 43a, 43b are only moved from the open state to the locked state if the readout unit 24 has identified the transponder of the cow 8 and established, on the basis of the sensor 50, that the cow 8 is pressing its nose against the flap of the drinking trough 17, i.e. the cow 8 is in the position and attitude in the milking station 10 in which the cow 8 can be reliably enclosed between the retaining posts 43a, 43b. In other words, the control system 41 makes use of the combination of the data from the transponder 23/readout unit 24 and the sensor 50 to determine whether the cow 8 in the milking station 10 has the position and attitude suitable for the neck lock.

On readout of the transponder 23 of a cow 8, the control system 41 furthermore determines whether or not the identified cow 8 fulfils the milking criterion, i.e. is/is not ready for milking. According to the invention however, these data are not used to operate the retaining posts 43a, 43b from the open state to the locked state. According to the invention, locking the cow 8 at the neck is not dependent on whether the cow 8 fulfils the milking criterion. It is not relevant whether the cow 8 is ready for milking or not: both a cow ready for milking and a cow not ready for milking are locked by the retaining posts 43a, 43b of the neck lock device 18. The control system 41 is programmed such that all cows 8 which, on a visit to the milking station 10, assume the position and attitude suitable for the neck lock in the milking station 10, are locked at the neck by means of the neck lock device 18. Each cow 8 which walks into a milking station 10 and then operates the flap 49 of the drinking trough 17 with its nose, is according to the invention then secured at the neck by the retaining posts 43a, 43b.

Because the cows 8 are always locked at the neck when, after walking into a milking station 10, the cows 8 begin to drink from the drinking trough 17, the cows 8 rapidly become accustomed to the neck lock 18. Consequently, the cows 8 stand quietly in the milking station 10 when the cows 8 are held at the neck. This is favorable for calmness in the herd, and furthermore has the particularly great advantage that the milking system 20 can easily and quickly automatically connect the milking cups 22 in the case that the cow 8 is ready for milking.

If the cow 8 locked at the neck is not ready for milking, this cow 8 need not be milked. After locking at the neck, the cow 8 may be released again almost immediately. The control system 41 is configured to release every cow 8 not ready for milking after a predefined period, calculated from the time at which the cow 8 is locked at the neck. The predefined period in this exemplary embodiment is around 15 seconds, but may be longer or shorter of course.

If the cow 8 locked at the neck is ready for milking, the control system 41 sends a signal to the milking system 20 to milk said cow 8. The control system 41 is programmed such that the neck lock device 18 remains locked until the milking of the cow 8 is completed. Only when the milking cups have been disconnected is the neck lock device operated by the control system 41 from the locked state to the open state, to release the cow 8. It is preferred that the neck lock device 18 is opened only around 5-30 minutes after disconnection of the milking cups 22. During this period, the teat openings of the milked cow 8 can recover.

As described above, in this exemplary embodiment, the entry openings 11 of the milking stations 10 are permanently accessible for the milking animals 10. The feature of always locking the cows 8 at the neck however may also be used in a system with milking stations which for example comprise an access gate (not shown). In this case, the system according to the invention is preferably configured such that the entry opening 11 of each milking station 10 which is not occupied by milking animal, is left open to allow a cow 8 into the milking station 10, irrespective of whether the cow 8 fulfils the milking criterion. In other words, if the entry openings 11 of the milking stations 10 can be closed by an access gate (not shown), the access gates are operated by the control system 41 so that each access gate of an unoccupied milking station 10 remains open. Every cow 8, irrespective of whether or not the cow complies with the milking criterion, can walk into the free milking station 10.

In the exemplary embodiment shown in FIGS. 1, 2 and 4a-4d, the robot device of the automatic milking system 20 is configured as an autonomous self-propelled trolley 21 for connection of the milking cups 22, wherein the trolley 21 is connected to the fixed world by means of a flexible connecting string 5 containing one or more pipes or lines.

The trolley 21 is connected by means of the flexible connecting string 35 to a coupling device 36 which is arranged at a fixed location in the animal-free space 70, for example on a wall of the barn, i.e. the connecting string 35 is connected at one end to the trolley 21 and at the other end to the coupling device 36. The coupling device 36 comprises a first connector device, while the flexible connecting string 35, at the end facing away from the trolley 21, is provided with a second connector device which can be releasably connected to the first connector device. When the first and second connector devices are coupled together, the different pipes or lines of the connecting string 35 are connected. This will be explained in more detail below.

The connecting string 35 is configured such that the trolley 21 can travel over the floor 71 of the animal-free space 70 into each of the milking stations 10, while the trolley 21 remains connected to the coupling device 36 by means of the connecting string 35. For example, the length and stiffness of the connecting string 35 are adapted such that the trolley 21 can travel into each milking station 10, up to below the teats of a cow 8. In this exemplary embodiment, the connecting string 35 is guided in the animal-free space 70 through an eye of a string guide 37 which is movably suspended on a guide rail 38. In this way, the connecting string 35 does not obstruct the trolley 21 in its travel over the floor 71. Such a string guide is however optional.

Although the connecting string 35 in FIGS. 4a-4d is indicated diagrammatically by a single solid line, the connecting string 35 in this exemplary embodiment comprises several pipes or lines, as indicated diagrammatically in FIG. 7. The various pipes or lines of the connecting string 35 are described below.

The connecting string 35 comprises four milk lines 80a, 80b, 80c, 80d. The four milking cups 22, known in themselves, of the trolley 21 each comprise a teat space and a pulsation space (not shown). In this exemplary embodiment, each milking cup 22 is connected by means of a double-channel hose 66 to a coupling piece 55 which is attached to the trolley 21. Each double-channel hose 66 comprises two channels (not shown). The one channel of the double-channel hose 66 is a milk-carrying channel which discharges a mixture of milk and air from the milking cup 22, while the other channel of the double-channel hose 66 forms a vacuum channel for application of a pulsating vacuum to the teat space of the milking cup 22. The vacuum channel is connected via the coupling piece 55 to a pulsator (not shown), which is attached to the trolley 21.

The four milk lines 80a, 80b, 80c, 80d of the connecting string 35 are connected at one end via the coupling piece 55 to the respective milk-carrying channels of the double-channel hoses 66. At the other end, the milk lines 80a, 80b, 80c, 80d are connected to the coupling device 36. The four milk lines 80a, 80b, 80c, 80d are each connected, via the mutually coupled first and second connector devices of the coupling device 36 and the connecting string 35 respectively, fluid-tightly and/or air-tightly to four milk-carrying lines 57a, 57b, 57c, 57d which are connected to a milk/air separator 33 for separating milk and air (see FIG. 2). The milk/air separator 33 is formed for example by a milk jar known in itself. The milk/air separator 33 is fixedly arranged in the animal-free space 70.

The milk/air separator 33 is in fluid connection via a milk transport line 34 with a milk storage tank 25 for the cooled storage of milk. The milk storage tank 25 is fixedly placed outside the accommodation space 2, for example in the animal-free space 70 or elsewhere. The milk transport line 34 comprises a milk pump 32 which transports milk from the milk/air separator 33 to the milk storage tank 25. Between the milk pump 32 and the milk storage tank 25, the milk transport line 34 comprises a three-way valve 27 for separating pre-milk and/or milk which is unsuitable for human consumption.

The connecting string 35 furthermore comprises a flexible vacuum line 81 which is in fluid connection with the pulsator attached to the trolley 21. The flexible vacuum line 81 connects the pulsator of the trolley 21 to the coupling device 36. The flexible vacuum line 81 is connected, via the mutually coupled first and second connector devices of the coupling device 36 and the connecting string 35 respectively, air-tightly to a vacuum line 59 which leads to a vacuum source 26. The vacuum source 26 is placed at a fixed location in the animal-free space 70. The vacuum source 26 is for example configured as a vacuum pump, known in itself, with rotation speed control. The vacuum source 26 is furthermore connected by means of a vacuum line 58 to the milk/air separator 33.

In addition, the connecting string 35 comprises a flexible power supply line 85. The power supply line 85 forms part of an electrical connection between the trolley 21 and an electrical power source 31, for example a high-voltage current source. The trolley 21 comprises several electric motors. For example, the trolley 21 in this exemplary embodiment has a drive and steering system for driving and steering the trolley 21. The trolley 21 has two tracks 73, and for each track 73 a respective electric motor is arranged on the trolley 21 (not shown). In addition, the trolley 21 comprises electric motors for moving the milking cups 22 relative to the trolley 21 so that the milking cups 22 can be connected automatically to the teats of a cow 8. For teat detection, the trolley 35 furthermore comprises a camera 74, in particular for producing three-dimensional images. Instead of the camera 74, other teat detection means may also be used. The electric motors and the camera 74 on the trolley 35 are supplied with electrical energy which is supplied via the flexible power supply line 85. At the coupling device 36, the power supply line 85 is connected to a supply cable 64, for example by means of plugs. The trolley 21 in this exemplary embodiment requires no electrical accumulators.

The connecting string 35 furthermore comprises a flexible water line 82, for example a water hose, which is connected at one end to the trolley 21. On the trolley 21, water is used for example to rinse the milking cups 22 after milking. The water line 82 is in fluid connection with the milking cups 22 on the trolley 35 (not shown). At the other end, the water line 82 is connected, via the mutually connected connector devices of the connecting string 35 and the coupling device 36, fluid-tightly to a water supply line 62 which is connected to a water connection 29. The water connection 29 is formed for example by a tap connected to the water mains.

The connecting string 35 is furthermore provided with a flexible compressed air line 83. Compressed air is used for example on the trolley 21 to blow clean a lens of the camera 74 or the milking cups 22 of the trolley 21. The compressed air line 82 is connected at one end to the trolley 21, for example in fluid connection with a nozzle provided on the trolley 21 (not shown). At the other end, the compressed air line 82 is connected, via the mutually connected connector devices of the connecting string 35 and coupling device 36, air-tightly to a compressed air line 61 which is connected to a compressed air source 28.

The connecting string 35 has a flexible data line 86, for example an ethernet cable, which is connected at one end to a control unit arranged on the trolley 21 (not shown). The data line 86 is connected via the control unit of the trolley 21 to the camera 74 of the trolley 35. In this exemplary embodiment, the image signal from the camera 74 is transmitted by the control unit of the trolley 35, via the data line 86, the connected connector devices of the connecting string 35 and of the coupling device 36, and a data cable 65, to the control system 41. On the basis of the image signal of the camera 74, the control system 41 can determine the position of the teats of a cow 8. Via the hard-wired data connection 65, 86, control signals can furthermore be sent by the control system 41 to the control unit on the trolley 21. The drive and steering system of the trolley 21 is controlled depending on the control signals. Data are sent from the trolley 21 to the control system 41 and vice versa via the hard-wired data connection.

In this exemplary embodiment, the connecting string 35 comprises a flexible fluid line 84 for disinfectant fluid, which is in fluid connection with a spray device arranged on the trolley 21 for spraying disinfectant fluid onto the teats of a cow 8. The fluid line 84 for disinfectant fluid is connected in the same manner as described above, via the coupling device 36 and an associated line 63, to a holder 30 for disinfectant. The sprayer device is aimed for example at one or more brushes for pretreatment of the teats of a cow 8 which must be milked. Instead of pretreatment with brushes, the trolley 21 may contain a pretreatment cup for pretreatment of the teats. In this case, the fluid line 84 is connected to the pretreatment cup of the trolley 21.

Also, one or more of the pipes or lines described above of the connecting string 35 may be omitted. For example, the trolley 21 comprises a holder for disinfectant, so that disinfectant need not be supplied to the trolley 21 and the fluid line 84 is not required. In addition to the pipes or lines described above, the connecting string 35 may also comprise other pipes or lines and/or cables.

Figure 4B:
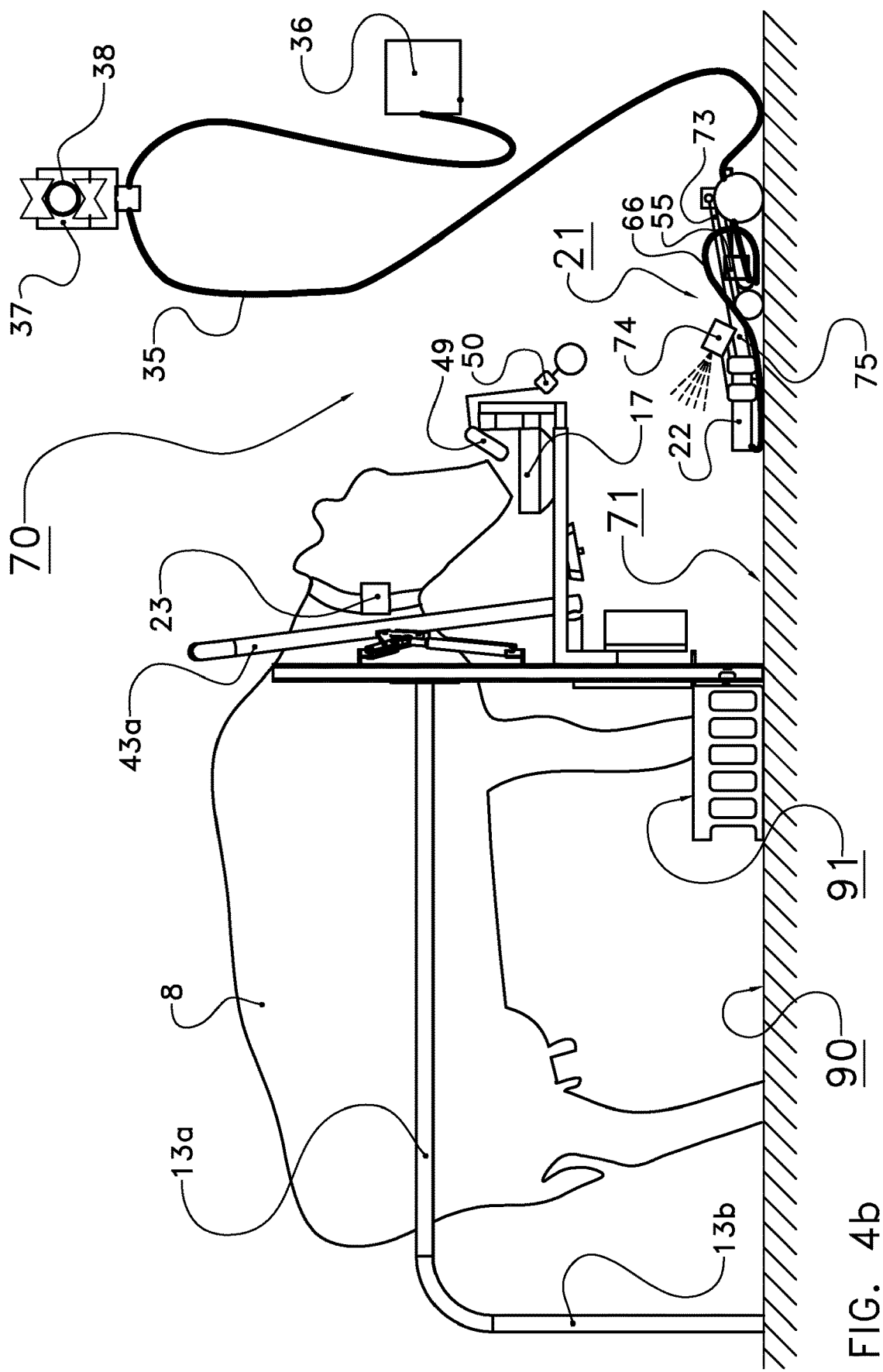
Figure 4C:
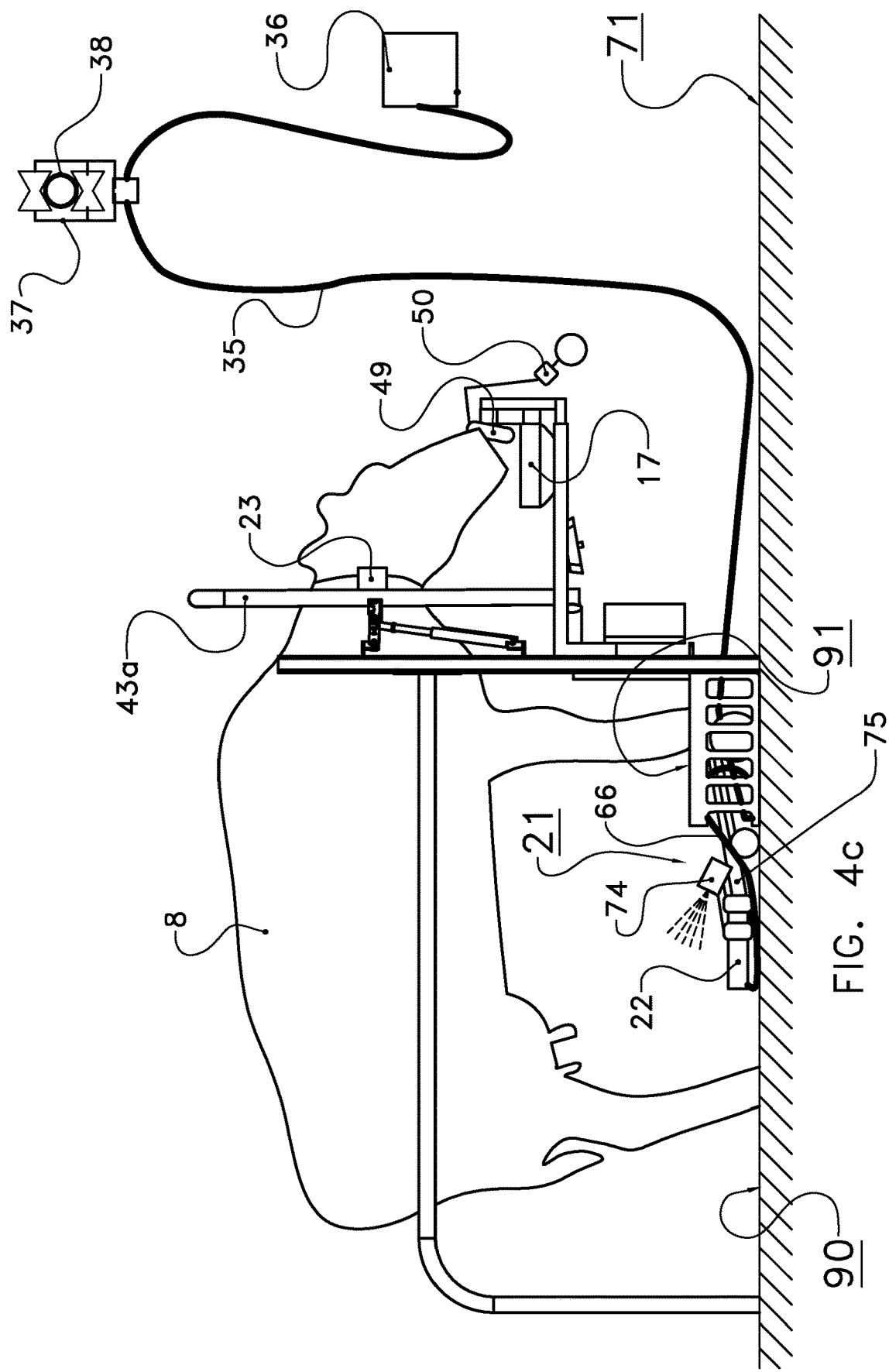
Figure 4D:
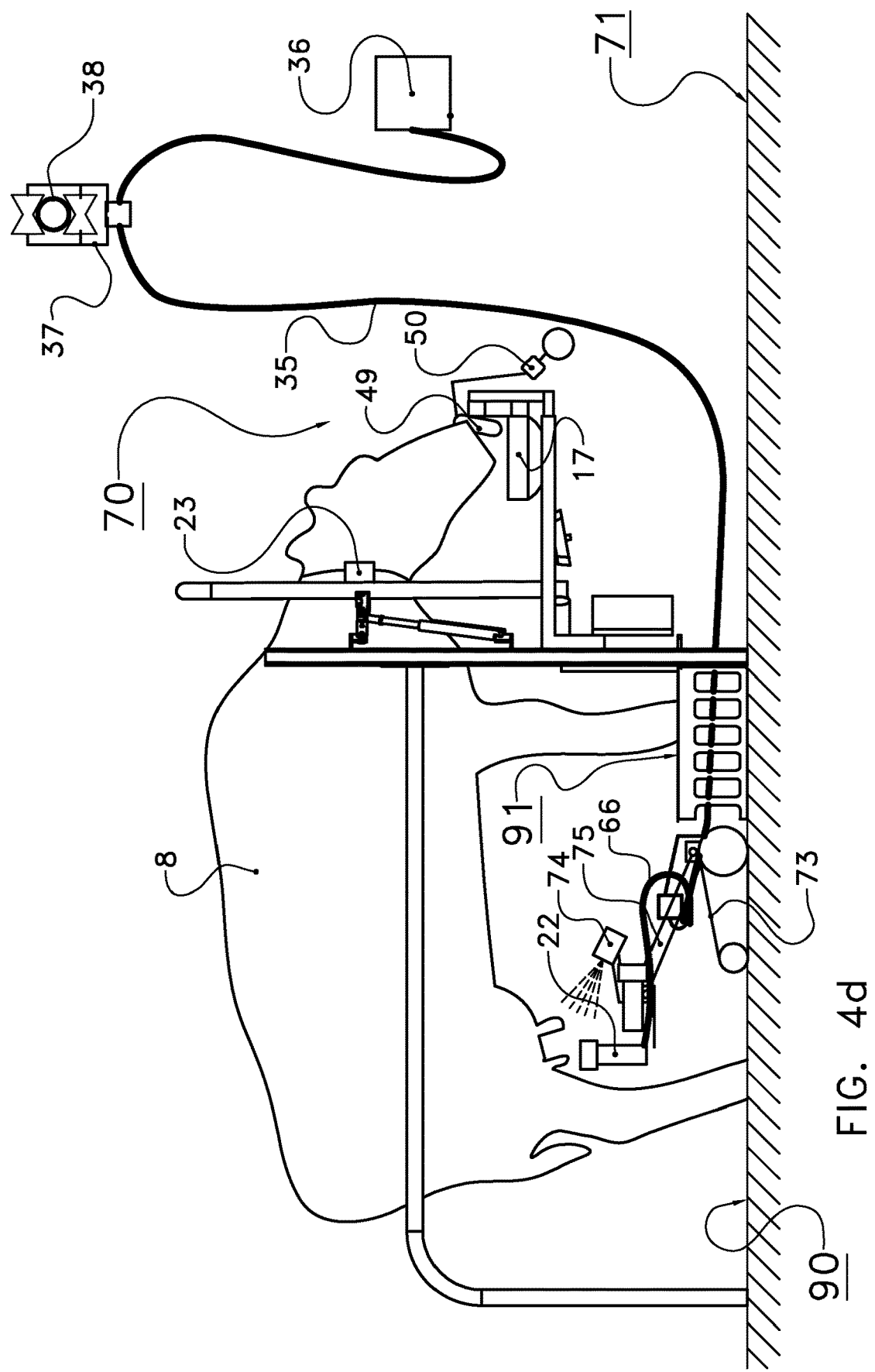
Figure 5:
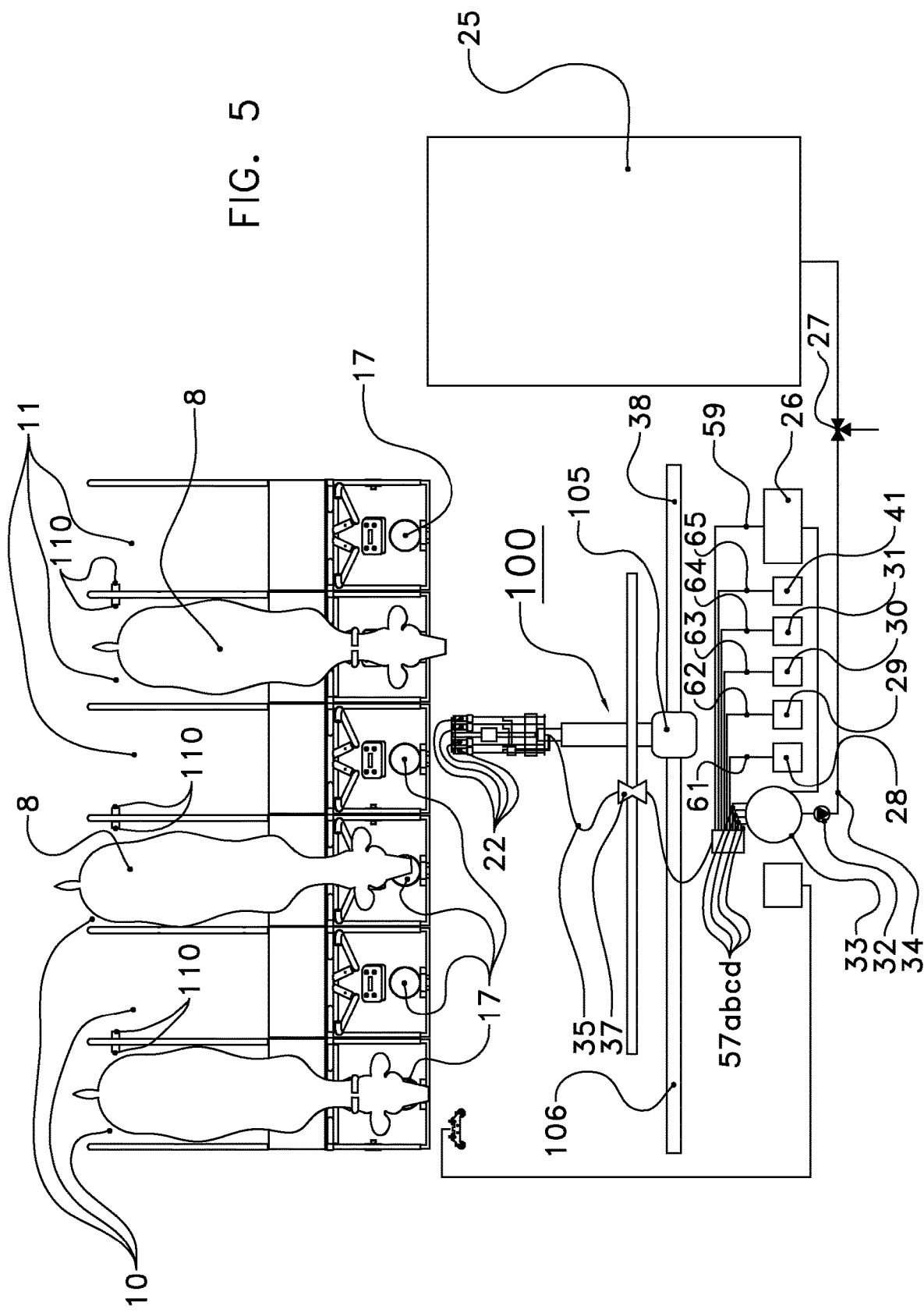
FIG. 5 shows a diagrammatic top view of a second embodiment of a system according to the invention.
Figure 6A:
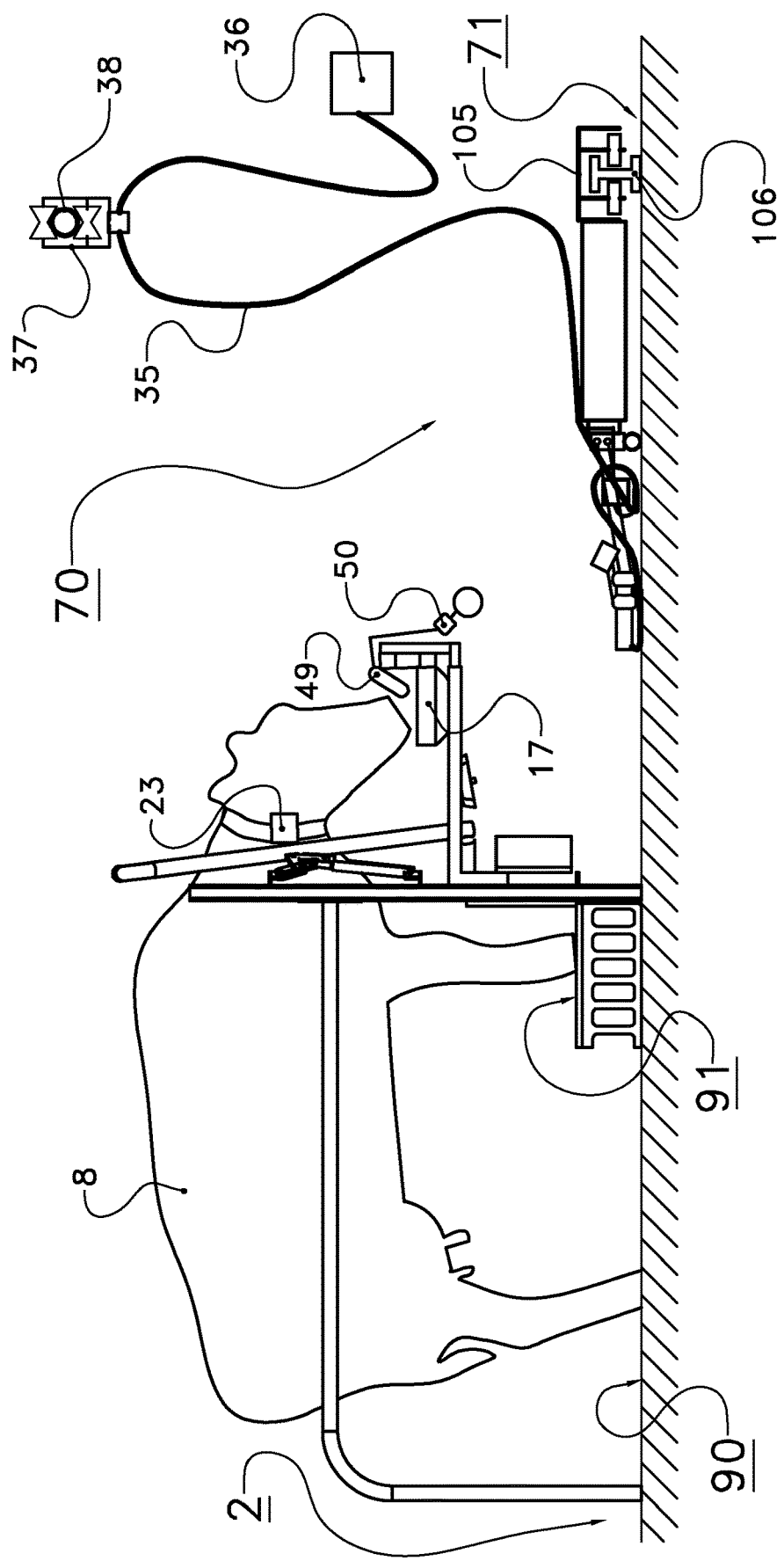
FIGS. 6a-6c show side views of one of the milking stations of the system shown in FIG. 5, in which a milking animal is secured and milked.
Figure 6B:
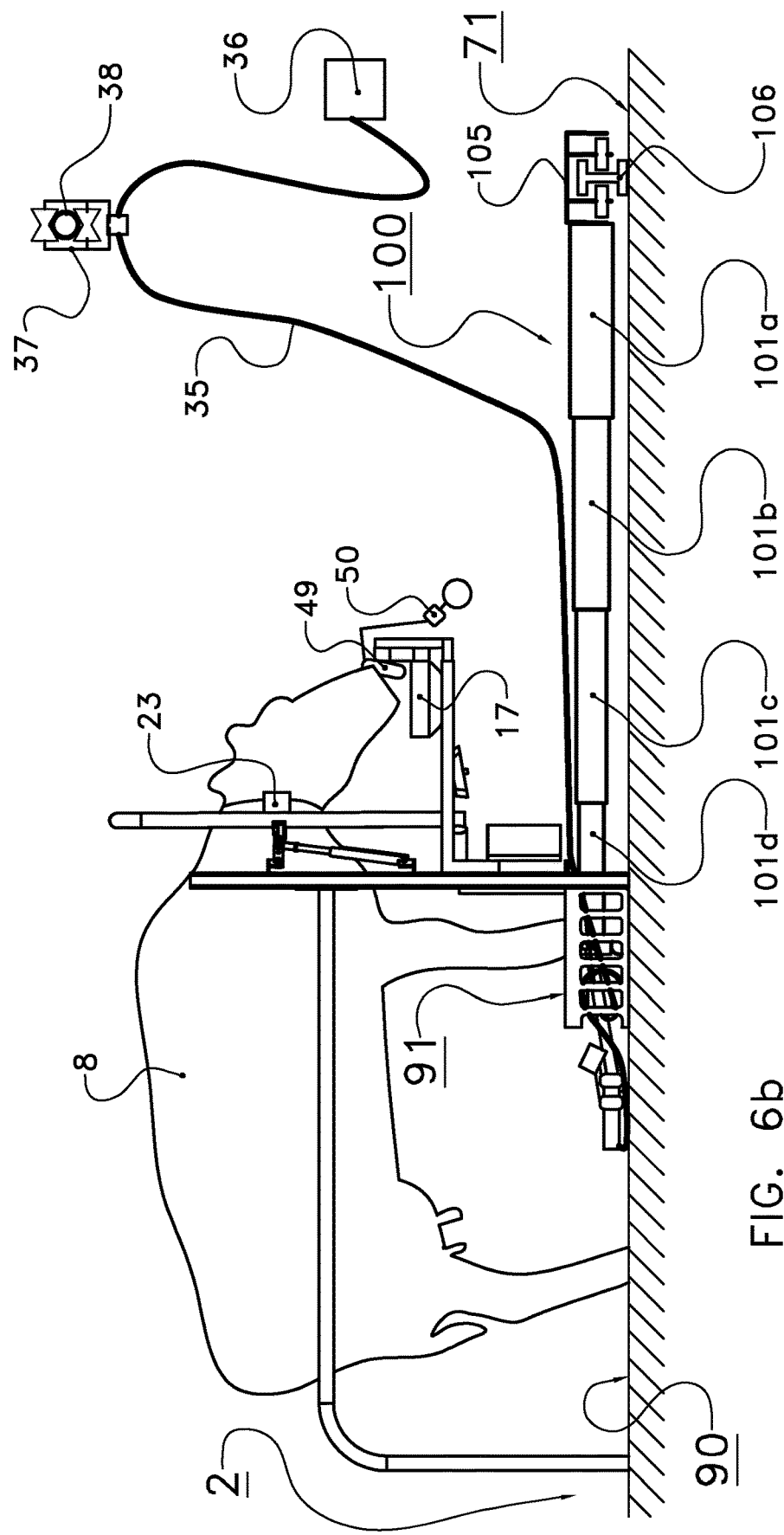
Figure 6C:
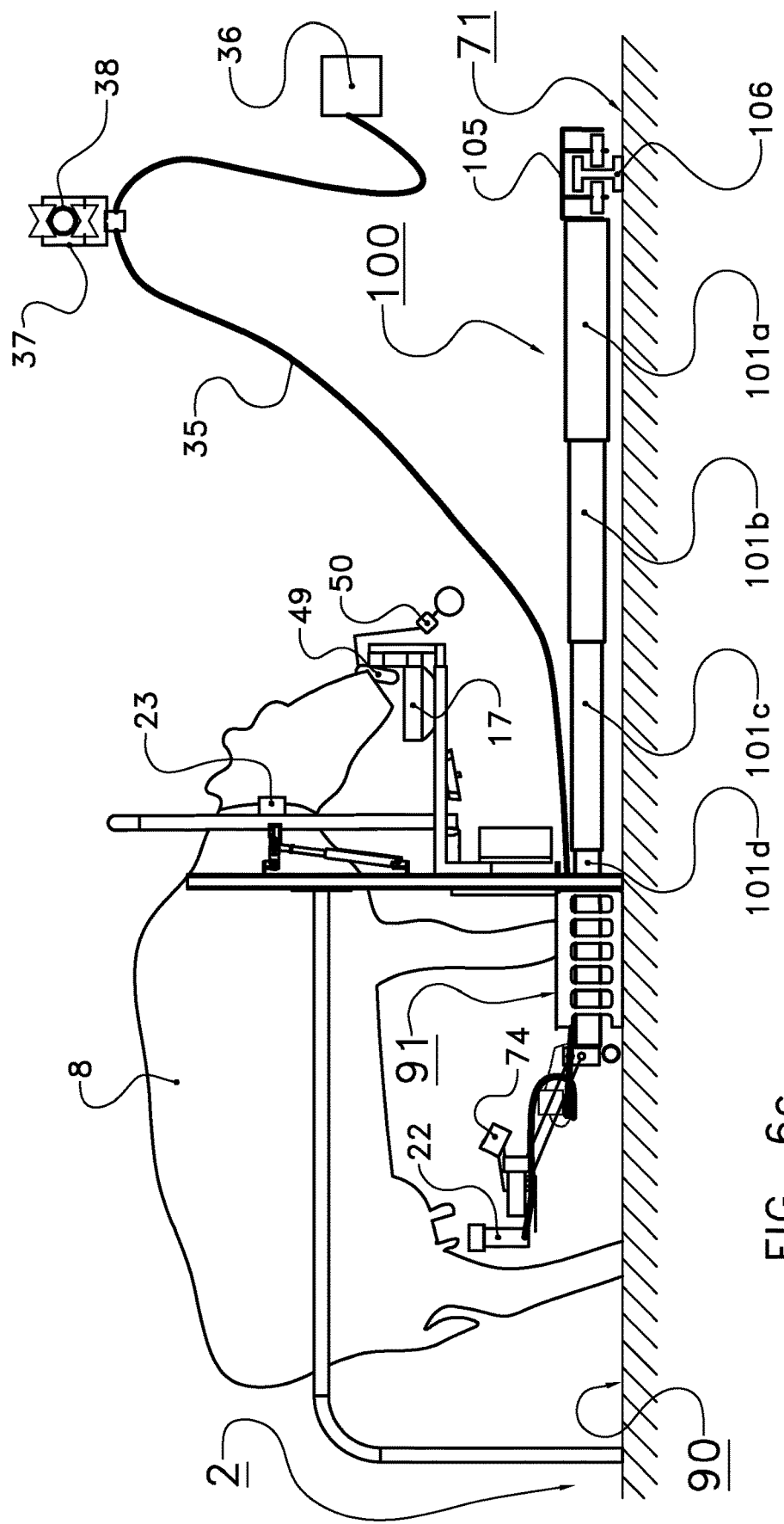

The milking cups 22 of the trolley 21 are arranged on a robot arm 75 which is movable between a lowered state (see FIGS. 4a-4c) and a raised state (see FIG. 4d). In this exemplary embodiment, the robot arm 75 is connected to a chassis of the trolley 21, pivotably between the lowered state and the raised state. The robot arm 75 can be driven by means of an electric drive motor (not shown) which is actively connected with the control system 41. The milking cups 22 of the trolley 35 are tiltable relative to the robot arm 75 between a retracted state (see FIGS. 4a-c) and an erected state (see FIG. 4d). In the retracted state, the milking cups 22 lie substantially horizontally, with the openings of the milking cups 22 opposite the direction of travel of the trolley 21, while in the erected state the milking cups 22 are tilted upward, for example extending substantially vertically upward. In this exemplary embodiment, the milking cups 22 are pretensioned in the erected state, for example by means of a spring means, and the trolley 21 comprises a tilt drive for tilting the milking cups 22 from the erected state to the retracted state (not shown). The tilt drive comprises an electric drive motor (not shown). The tilt drive is actively connected to the control system 41.

As shown most clearly in FIGS. 4a-4d, the milking stations 10 each comprise a floor with a first floor part 90 and a second floor part 91 which is raised relative to the first floor part 90. The first floor part 90 is connected below the second floor part 91 to the floor 71 of the animal-free space 70. In this exemplary embodiment, the floor 71 of the animal-free space 70 and the first floor part 90 form a cohesive floor. The trolley 21 can travel over the flat floor 71 of the animal-free space 70, under the second floor part 91, onto the first floor part 90 of each milking station 10.

The raised second floor part 91 is arranged for example 20 cm higher than the first floor part 90. Such a raised position corresponds in principle to the normal height difference between a lying stall and the floor in a barn. The length of the second floor part 91, viewed in the longitudinal direction of each milking station 10, is such that when a cow 8 stands in the milking station 10 with its front legs on the second floor part 91, the rear legs of said cow 8 stand on the first floor part 90. The length of the second floor part in this exemplary embodiment is 50 cm. A cow 8 in a milking station 10 can only drink from the drinking trough 17 of said milking station if the cow 8 stands with its front legs on the second floor part 91. When the cow 8 stands with its front legs on the second floor part 91, the cow 8 has a position and/or attitude which is suitable for connecting the milking cups 22 of the trolley 21 to the teats of said cow 8.

When a cow 8 visits one of the milking stations 10 to drink from the drinking trough 17 and said cow 8 is ready for milking, the control system 41 controls the trolley 21 so that the trolley 21 travels automatically over the floor 71 of the animal-free space 70, onto the first floor part 90 of said milk station 10, to under the teats of said cow 8. Since only a restricted height is available under the second floor part 91, the trolley 35 with erected milking cups 22 is unable to travel below the second floor part 91, even if the robot arm 75 is lowered.

To enable the trolley 21 to travel from the floor 71 of the animal-free space 70, under the fence 14 and the second floor part 91, the milking cups 22 of the trolley 21, with the robot arm 75 in the lowered state, are tilted down into the retracted state. The trolley 21 then fits under the second floor part 91 (see FIG. 4c). After the trolley 21 has passed under the second floor part 91, the control system 41 controls the electric drive motor of the robot arm 75 to bring this into the raised state, and the tilt drive to move the milking cups 22 to the erected state. Then the milking cups 22 are connected automatically to the teats of the cow 8 on the basis of control signals from the control system 41. The trolley 21 can be moved inside the milking station 10 and/or the robot arm 75 can be controlled relative to the trolley 21 to connect the milking cups 22 automatically to the teats of a cow 8 in the milking station 10.

During travel over the floor 71 of the animal-free space 70, and up to the first floor part 90 of the milking station 10, the trolley 21 remains connected to the coupling device 36 by means of the flexible connecting string 35. Since the pipes or lines of the connecting string 35 are used to discharge the milk, to supply a vacuum, water, compressed air and disinfectant, and to exchange data, the trolley 21 can be configured particularly light and compact.

Also, in an embodiment not shown, according to the invention it is possible that milk and air discharged from the milking cups 22 are separated from each other on the trolley 21. For example, the milking cups 22 are each connected to a milk/air separator which is arranged on the trolley 21. The milk/air separator of the trolley 21 has a milk discharge opening which is in fluid connection with a milk pump arranged on the trolley 21. The milk pump is connected to a single flexible milk line which extends through the connecting string 35 to the coupling device 36. Only milk flows through the flexible milk line of the connecting string 35. Only one milk line is required for transporting the milk. The milk is discharged from the coupling device 36 to the milk storage tank 25 as described above. Since the milk pump in this case is arranged on the trolley 21, the milk can be transported from the trolley 21 to the milk storage tank 25 particularly efficiently.

In a further embodiment (not shown), according to the invention, the system comprises two or more autonomous self-propelled trolleys. For example, a second trolley contains a device for pretreatment and/or post-treatment of the teats of a cow 8 in a milking station 10. The second trolley can pretreat, for example clean, disinfect and/or stimulate, the teats of the cow 8 in a milking station 10, before the first trolley 21 automatically connects the milking cups 22 to the teats. In addition or alternatively, the second trolley may be configured to post-treat the teats of the milk cow 8, i.e. after the first trolley 21 has milked the cow 8 and travelled away, the second trolley travels under the milk cow 8 for post-treatment. Therefore firstly the pretreatment and/or post-treatment, and secondly the milking, are carried out by different trolleys. Also, a second trolley may be configured in the same way as the first trolley.

An alternative embodiment of the system is shown in FIGS. 5, 6a-6c. The same or similar components carry the same reference numerals. In this case, the system comprises a telescopic robot arm 100. The telescopic robot arm 100 comprises several arm parts 101a, 101b, 101c, 101d which are telescopically connected to each other. By extending and retracting the arm parts 101a, 101b, 101c, 101d, the robot arm 100 can be moved in the longitudinal direction of the milking station 10. The first arm part 101a of the robot arm 100 is fixed to an arm guide 105 which is connected to a fixed supporting structure. In this exemplary embodiment, the supporting structure comprises a guide rail 106 connected to the floor 71 of the animal-free space 70. The arm guide 105 with the robot arm 100 attached thereto is guided movably over the guide rail 106 by means of rollers, in the transverse direction of the milking stations 10. The function of the robot arm 100 is furthermore substantially the same as that of the trolley 21 described above, and will not therefore be explained further. It is also possible that the flexible connecting string 35 on the robot arm 100 is configured differently, for example is replaced by pipes, lines and/or cables which are arranged on the robot arm 100.

Although the guide rail 106 in this exemplary embodiment is attached to the floor 71 of the animal-free space 70, the guide rail 106 for the arm guide 105 may also be suspended. The robot arm 100 may furthermore, instead of a telescopic arm, also be configured as a robot arm with several arm parts connected pivotably relative to each other (not shown). Instead of a robot arm 100 which can perform a rectilinear movement transversely relative to the milking stations 10, according to the invention it is also possible that the robot arm is connected to a fixed supporting structure about a substantially vertical pivot axis, for example by means of a ball joint. In this case, the milking stations may be placed around the pivot axis, i.e. the milking stations then lie laterally next to each other in an arc, such that the milking stations are oriented with their head sides substantially towards the pivot axis. By pivoting the robot arm, the robot arm can be aligned with each of the milking stations so that the robot arm can connect milking cups in each milking station. Such robot arms for connection of milking cups 22 may be designed and produced using techniques known in themselves in practice.

The robot arm 100 shown in FIGS. 5, 6a-6c is provided with milking cups 22. The milking cups 22 are arranged on the robot arm 100. During operation, the robot arm 100 connects the milking cups 22 one by one to the teats of a cow 8. It is however also possible that the milking system 20 is provided with a milking cup holder (not shown), configured for holding the milking cups 22 which are not being used. The robot arm 100 in this case comprises a gripper member (not shown), which is configured to take at least one milking cup 22 from the milking cup holder and connect this to a teat of a cow 8. During operation, the robot arm 100 takes a first milking cup 22 from the milking cup holder and connects said milking cup to a teat, then the robot arm 100 takes a second milking cup 22 from the milking cup holder, and so on. Also, such a robot arm can be produced using techniques known in themselves in practice. The milking cup holder with a set of milking cups 22 may be arranged in the animal-free space 70, or such a milking cup holder with a set of milking cups 22 may be arranged in each milking station 10. With such a robot arm 100, each milking station 10 may comprise a set of milking cups 22. The milking cups 22 are for example arranged in sets in the animal-free space 70 in front of each milking station 10 or in each milking station 10, for example close to the teats of a cow 8. It is also possible that a common set of milking cups 22 is shared by several milking stations 10. The milking cups 22 are then used successively in several milking stations 10.

After a cow 8 has been milked, in the exemplary embodiments described above, said cow 8 may remain in the milking station until the cow 8 voluntarily leaves the milking station, unless the cow 8 complies with a predefined expulsion criterion and all milking stations 10 are occupied by other cows. As indicated diagrammatically in the figures, each milking station 10 comprises an expulsion means 110 for driving a cow 8 out of the milking station 10. The expulsion means 110 may be activated, in each of the milking stations 10, to give an expulsion stimulus to a milking animal present in the milking station 10, to encourage it to leave the milking station 10. The expulsion means 110 may be configured in various ways, for example for administering an electric shock to a cow 8 in the milking station 10. Alternatively or additionally, the expulsion means 110 may be configured to give a cow 8 an expulsion stimulus in the form for example of a light signal, an audible signal or a contact signal, such as by means of a water-jet, an air pulse, or a mechanical push or contact element. Also, according to the invention it is possible that the expulsion means are movable relative to the milking stations 10, such that an expulsion stimulus can be given in each milking station 10 to a cow 8 present in said milking station 10 (not shown). Furthermore, according to the invention it is possible that the system 1, instead of or in addition to the expulsion means 110, has an attraction means and/or other motivation means for giving a stimulus in order to entice the cows 8 to leave the milking stations, for example by means of feed concentrate.

To be able to activate the expulsion means, the expulsion means 110 are each actively connected to the control system 41. The control system 41 controls the expulsion means 110 such that the expulsion means 110 are only activated if two conditions are fulfilled: (i) a cow 8 in one of the milking stations 10 fulfils the predefined expulsion criterion, and (ii) all milking stations 10 are occupied. The expulsion criterion may comprise different parameters. For example, the expulsion criterion is dependent on the milking criterion, such as whether the cow 8 fulfils the milking criterion or fulfils the milking criterion within a predefined period, and/or the visit behavior of the cow 8, such as the expected time between two successive visits of the cow 8 to the milking stations, and/or the drinking behavior of the cow 8, such as the water intake, i.e. how much the cow 8 drinks from the drinking trough, and/or other parameters. The expulsion criterion may furthermore be determined individually for each individual cow 8 in the accommodation space 2. Also with a cow-dependent milking criterion however, an expulsion criterion may be used which is the same for all cows 8 in the accommodation space 2.

As described above, the number of milking stations 10 according to the invention is selected such that it does not occur or rarely occurs that all milking stations 10 are occupied simultaneously, i.e. during operation, almost always one or more milking stations 10 are free. Since a cow 8 is only expelled from the milking station if condition (ii) is fulfilled, i.e. all the milking stations are occupied, a cow 8 is driven out only in very exceptional cases. This has a positive effect on the extent to which the cows 8 voluntarily visit the milking stations 10. The system according to the invention is configured to allow every cow 8 visiting a milking station 10 to remain there in principle until said cow 8 voluntarily leaves the milking station. The milking animals are only subjected to expulsion stimuli, which are perceived by the cows 8 as uncomfortable, in the exceptional circumstance that all milking stations 10 are occupied. In addition, the control system 41 also determines whether the cow 8 to be driven out complies with the predefined expulsion criterion.

Instead of driving out cows by means of the expulsion means 110 only in very exceptional circumstances, according to the invention it is also possible to allow the cows always to remain in the milking stations until the cows voluntarily leave the milking stations. In this case, no expulsion means 110 are required, i.e. the expulsion means 110 are omitted in this embodiment (not shown). None of the milking stations 10 comprises expulsion means. Also, the system does not comprise any attraction means or other motivation means for encouraging the cows 8 to leave the milking stations. The cows 8 may remain in the milking stations 10 until the cows 8 voluntarily leave the milking stations 10. As described above, the cows 8 have access to the milking stations 10 irrespective of whether or not the cows 8 fulfil the milking criterion, i.e. irrespective of whether the cows 8 must be milked. Both cows 8 which have been milked, and cows 8 which visit the milking stations 10 to drink without needing to be milked, may remain in the milking stations 10. In this case, it cannot be completely excluded that all milking stations 10 are occupied at some time by the cows 8. If all milking stations 10 are occupied, a cow 8 from the accommodation space 2 which wishes to drink, must wait until one of the cows 8 voluntarily leaves the milking station 10. As explained above, the number of milking stations 10 is however sufficiently great, relative to the number of cows 8 contained in the accommodation space 2, that the risk is minimal that all milking stations 10 will remain occupied simultaneously for an unacceptable period.

The invention is not restricted to the exemplary embodiments shown in the drawing. The person skilled in the art may make various adaptations which lie within the scope of the invention. The features described above may be used both separately and in any arbitrary combination, and/or be combined with one or more features according to one or more of the claims which follow. In particular, according to the invention, the drinking system with drinking troughs 17 may be replaced by a feed and/or drinking system for providing feed and/or water for the milking animals. The feed and/or drinking system comprises for example a feed and/or drinking trough for each milking station. The milking animals then visit the milking stations to eat and/or drink. Furthermore, according to the invention, it is possible that the system, instead of the neck lock device described in the description and claims, comprises another holding device for securing and/or holding a milking animal in a milking station. For example, each milking station has a holding device which can be operated by means of an actuator device between a holding state, in which a milking animal present in said milking station is held by the holding device, and a free state, in which a milking animal present in said milking station is free to leave said milking station. Such a holding device for example comprises a door or gate to enclose a milking animal in a milking station, such as in a generally known milking stall.

The invention claimed is:

1. A system for milking a group of milking animals, including cows, wherein the system comprises:
    an accommodation space for the milking animals;
    a plurality of milking stations each arranged at a fixed location and next to each other, wherein the milking stations each comprise an entry opening for entry of a milking animal from the accommodation space to said milking station, and wherein each milking station at a head end thereof comprises a neck lock device, which can be moved by way of an actuator device between a locked state in which a milking animal in said milking station can be locked at the neck by the neck lock device, and an open state in which a milking animal in said milking station is free to move its head in and out of said neck lock device;
    a control system which is actively connected to the actuator device of each neck lock device, wherein the control system is configured to control the actuator devices; and
    an automatic milking system for automatic milking of milking animals present in the milking stations, wherein the milking system is configured to milk a milking animal which is locked at the neck in a milking station by way of the neck lock device of said milking station on condition that said milking animal fulfils a predefined milking criterion,
    wherein the control system is configured to determine, for each milking station, whether a milking animal in said milking station has at least one of a position and an attitude which is suitable for locking said milking animal at the neck by the neck lock device of said milking station, and to control the actuator devices such that each milking animal which enters one of the milking stations and then assumes said at least one of the position and the attitude, irrespective of whether said milking animal fulfils the milking criterion, is locked at the neck in said milking station by movement of the neck lock device of said milking station from the open state to the locked state.

2. The system as claimed in claim 1, wherein the milking stations at the head ends thereof further comprise at least one trough suitable for feeding, drinking, or both, and wherein the at least one of the position and the attitude of a milking animal in a milking station which is suitable for locking said milking animal at the neck by the neck lock device of said milking station, is formed by the at least one of the position and the attitude of said milking animal when said milking animal is situated with its head above or in the trough of said milking station.

3. The system as claimed in claim 2, wherein each milking station further comprises a separate trough suitable for feeding, drinking, or both, and wherein the trough of each milking station is positioned relative to the neck lock device of said milking station such that a milking animal in said milking station must push its head through the neck lock device of said milking station in the open state in order to eat or drink.

4. The system as claimed in claim 3, wherein the system further comprises a supply device for the supply of feed or and/or water to each trough, and wherein at the trough of each milking station, the supply device comprises a sensor device for sensing whether a milking animal is positioned with its head above or in the feed and/or drinking trough, and wherein the supply device is configured such that feed and/or water are supplied to each trough only if the associated sensor device has sensed that a milking animal is positioned with its head above or in said feed and/or drinking trough.

5. The system as claimed in claim 4, wherein the sensor device further comprises a respective valve at each trough, wherein each valve is pretensioned to a closed state in which the supply of feed or water to the associated trough is shut off, and can be actuated by a milking animal from the closed state to an open state for the supply of feed or water to said trough.

6. The system as claimed in claim 4, wherein the sensor device further comprise a respective sensor at each trough, and wherein each sensor is configured to detect whether feed or water are supplied to an associated trough.

7. The system as claimed in claim 4, wherein the supply device is configured to determine a respective quantity of feed or water supplied to each trough by the supply device.

8. The system as claimed in claim 2, wherein the milking stations at the head ends thereof are delimited by a fixed fence, wherein the neck lock devices of the milking stations are arranged on the fence, and wherein the at least one trough is positioned along the fence such that a milking animal in each milking station must push its head or neck through the fence in order to eat or drink from said trough.

9. The system as claimed in claim 8, wherein at each milking station, the fence comprises two fixed fence parts arranged at a distance from each other to leave a central opening with a first width, such that the neck of a cow fits in between as far as the shoulders, and wherein the neck lock device of each milking station comprises two retaining posts, which in the locked state determine between them a retaining opening with a second width which is smaller than the first width, such that a cow which pushes its head through the retaining opening cannot withdraw its head therefrom.

10. The system as claimed in claim 1, wherein the system further comprises an animal identification system for identifying each milking animal which is present in one of the milking stations.

11. The system as claimed in claim 10, wherein the animal identification system comprises transponders which are arranged on each of the milking animals, and also with readout units for reading the transponders, wherein one of the readout units is arranged at the head end of each milking station.

12. The system as claimed in claim 1, wherein the neck lock device of each milking station comprises two retaining posts which are each pivotable about a respective pivot axis running substantially horizontally and obliquely relative to a longitudinal direction of said milking station.

13. The system as claimed in claim 1, wherein the control system is configured such that the neck lock device of each milking station which is not occupied by a milking animal, is in the open state.

14. The system as claimed in claim 1, wherein the system is configured such that the entry opening of each milking station which is not occupied by a milking animal is open for entry of a milking animal into said milking station, irrespective of whether the milking animal fulfils the milking criterion.

15. The system as claimed in claim 1, wherein the control system is configured, if a milking animal which does not fulfil the predefined milking criterion is locked at a point in time at the neck in a milking station by the neck lock device of said milking station, to move the neck lock device of said milking station by way of the actuator device from the locked state to the open state after expiry of a period following said point in time.

16. The system as claimed in claim 1, wherein the control system is configured, if a milking animal which fulfils the predefined milking criterion is locked at a point in time at the neck in a milking station by the neck lock device of said milking station, to keep said milking animal locked at the neck in said milking station while the milking system milks said milking animal, and after said milking animal has been milked, to move the neck lock device of said milking station from the locked state to the open state by way of the actuator device.

17. The system as claimed in claim 1, wherein the control system is configured to determine, for each milking station, whether a milking animal in said milking station has the position which is suitable for locking said milking animal at the neck by the neck lock device of said milking station, and to control the actuator devices such that each milking animal which enters one of the milking stations and then assumes said position, irrespective of whether said milking animal fulfils the milking criterion, is locked at the neck in said milking station by movement of the neck lock device of said milking station from the open state to the locked state.

18. The system as claimed in claim 1, wherein the control system is configured to determine, for each milking station, whether a milking animal in said milking station has the attitude which is suitable for locking said milking animal at the neck by the neck lock device of said milking station, and to control the actuator devices such that each milking animal which enters one of the milking stations and then assumes said attitude, irrespective of whether said milking animal fulfils the milking criterion, is locked at the neck in said milking station by movement of the neck lock device of said milking station from the open state to the locked state.

19. A method for milking a group of milking animals, including cows, using a system having an accommodation space for the milking animals; a plurality of milking stations each arranged at a fixed location and next to each other, wherein the milking stations each comprise an entry opening for entry of a milking animal from the accommodation space to said milking station, and wherein each milking station at a head end thereof comprises a neck lock device, which can be moved by way of an actuator device between a locked state in which a milking animal in said milking station can be locked at the neck by the neck lock device, and an open state in which a milking animal in said milking station is free to move its head in out of said neck lock device; a control system which is actively connected to the actuator device of each neck lock device, wherein the control system is configured to control the actuator devices; and an automatic milking system for automatic milking of milking animals present in the milking stations, wherein the milking system is configured to milk a milking animal which is locked at the neck in a milking station by way of the neck lock device of said milking station on condition that said milking animal fulfils a predefined milking criterion, wherein the control system is configured to determine, for each milking station, whether a milking animal in said milking station has a position and/or attitude which is suitable for locking said milking animal at the neck by the neck lock device of said milking station, and to control the actuator devices such that each milking animal which enters one of the milking stations and then assumes said position and/or attitude, irrespective of whether said milking animal fulfils the milking criterion, is locked at the neck in said milking station by movement of the neck lock device of said milking station from the open state to the locked state, the method comprising:

- determining, by way of the control system, whether a milking animal which has entered a milking station assumes in said milking station a position and/or attitude which is suitable for locking said milking animal at the neck by the neck lock device of said milking station; and
- when said milking animal assumes said position and/or attitude, controlling the actuator device of the neck lock device of said milking station by way of the control system such that said milking animal is locked at the neck by the neck lock device of said milking station irrespective of whether said milking animal fulfils the milking criterion.

\* \* \* \* \*